US011490056B2

(12) United States Patent
Sato et al.

(10) Patent No.: US 11,490,056 B2
(45) Date of Patent: Nov. 1, 2022

(54) DRONE SYSTEM AND METHOD OF CAPTURING IMAGE OF VEHICLE BY DRONE

(71) Applicant: Toyota Jidosha Kabushiki Kaisha, Toyota (JP)

(72) Inventors: Kenji Sato, Toyota (JP); Kei Yamamoto, Toyota (JP); Takashi Nishimoto, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/145,753

(22) Filed: Jan. 11, 2021

(65) Prior Publication Data

US 2021/0218935 A1 Jul. 15, 2021

(30) Foreign Application Priority Data

Jan. 15, 2020 (JP) .............................. JP2020-004196

(51) Int. Cl.
| | |
|---|---|
| *H04N 7/18* | (2006.01) |
| *H04N 5/232* | (2006.01) |
| *B64C 39/02* | (2006.01) |
| *B64D 47/08* | (2006.01) |
| *B60R 1/00* | (2022.01) |

(Continued)

(52) U.S. Cl.
CPC ............... *H04N 7/185* (2013.01); *B60R 1/00* (2013.01); *B64C 39/024* (2013.01); *B64D 47/08* (2013.01); *G05D 1/0088* (2013.01); *G05D 1/0094* (2013.01); *G05D 1/101* (2013.01); *H04N 5/23299* (2018.08); *B60R 2300/10* (2013.01); *B60R 2300/607* (2013.01); *B64C 2201/027* (2013.01); *B64C 2201/127* (2013.01); *B64C 2201/141* (2013.01)

(58) Field of Classification Search
None
See application file for complete search history.

(56) References Cited

U.S. PATENT DOCUMENTS

| | | | |
|---|---|---|---|
| 2016/0018822 A1* | 1/2016 | Nevdahs | .............. G05D 1/0094 701/26 |
| 2016/0023762 A1* | 1/2016 | Wang | ........................ B60R 9/00 701/3 |

(Continued)

FOREIGN PATENT DOCUMENTS

| | | |
|---|---|---|
| JP | 2016-153337 A | 8/2016 |
| WO | 2018230680 A1 | 12/2018 |

*Primary Examiner* — Heather R Jones
(74) *Attorney, Agent, or Firm* — Dinsmore & Shohl LLP

(57) ABSTRACT

A controller of a drone includes a storage unit that stores a scene information database containing a plurality of scene information sets arranged in time series of a video, in each of the scene information sets, a relative position with respect to a vehicle in capturing a scene of the video and a duration of the scene are associated with each other, a vehicle information acquisition unit that receives vehicle information from the vehicle, a traveling position estimation unit that estimates a future traveling position of the vehicle based on the vehicle information, and a flight path calculation unit that, based on the estimated traveling position and the scene information database, calculates, for each of the scenes, a flight path that passes through the relative position with respect to the vehicle.

8 Claims, 18 Drawing Sheets

(51) Int. Cl.
    *G05D 1/00*      (2006.01)
    *G05D 1/10*      (2006.01)

(56) References Cited

U.S. PATENT DOCUMENTS

| | | | |
|---|---|---|---|
| 2018/0141453 A1 | 5/2018 | High et al. | |
| 2018/0158197 A1* | 6/2018 | Dasgupta | G06T 7/20 |
| 2018/0321693 A1* | 11/2018 | Tu | G05D 1/12 |
| 2020/0027357 A1* | 1/2020 | Zhou | G08G 5/0069 |
| 2020/0202722 A1* | 6/2020 | Pydin | G08G 5/0082 |
| 2020/0385116 A1* | 12/2020 | Sabripour | G08G 5/0026 |
| 2022/0044574 A1* | 2/2022 | Chow | H04N 5/23206 |
| 2022/0137648 A1* | 5/2022 | Huang | G05D 1/12 |
| | | | 701/3 |

\* cited by examiner

SCENE INFORMATION DATABASE

VIDEO NUMBER     1     — 36

| | |
|---|---|
| NUMBER | 001 |
| SCENE | 71 |
| RELATIVE POSITION IN VEHICLE FRONT-AND-REAR DIRECTION | FRONT 100 M |
| RELATIVE POSITION IN VEHICLE RIGHT-AND-LEFT DIRECTION | CENTER |
| RELATIVE POSITION IN VEHICLE HEIGHT DIRECTION | 10 M FROM ROAD SURFACE |
| DURATION | AA SEC |

— 36a

| | |
|---|---|
| NUMBER | 002 |
| SCENE | 72 |
| RELATIVE POSITION IN VEHICLE FRONT-AND-REAR DIRECTION | FRONT 30 M |
| RELATIVE POSITION IN VEHICLE RIGHT-AND-LEFT DIRECTION | CENTER |
| RELATIVE POSITION IN VEHICLE HEIGHT DIRECTION | 10 M FROM ROAD |
| DURATION | BB SEC |

| | |
|---|---|
| NUMBER | 003 |
| SCENE | 73 |
| RELATIVE POSITION IN VEHICLE FRONT-AND-REAR DIRECTION | FRONT 3 M |
| RELATIVE POSITION IN VEHICLE RIGHT-AND-LEFT DIRECTION | LEFT SIDE 5 M |
| RELATIVE POSITION IN VEHICLE HEIGHT DIRECTION | 1.5 M FROM ROAD |
| DURATION | CC SEC |

| | |
|---|---|
| NUMBER | 004 |
| SCENE | 74 |
| RELATIVE POSITION IN VEHICLE FRONT-AND-REAR DIRECTION | FRONT 12 M |
| RELATIVE POSITION IN VEHICLE RIGHT-AND-LEFT DIRECTION | LEFT SIDE 1 M |
| RELATIVE POSITION IN VEHICLE HEIGHT DIRECTION | 1.5 M FROM ROAD |
| DURATION | DD SEC |

| | |
|---|---|
| NUMBER | 005 |
| SCENE | 75 |
| RELATIVE POSITION IN VEHICLE FRONT-AND-REAR DIRECTION | FRONT 13 M |
| RELATIVE POSITION IN VEHICLE RIGHT-AND-LEFT DIRECTION | CENTER |
| RELATIVE POSITION IN VEHICLE HEIGHT DIRECTION | 1.5 M FROM ROAD |
| DURATION | EE SEC |

FIG. 5

DRONE SYSTEM AND METHOD OF CAPTURING IMAGE OF VEHICLE BY DRONE

CROSS REFERENCE TO RELATED APPLICATION

This application claims priority to Japanese Patent Application No. 2020-004196 filed on Jan. 15, 2020, which is incorporated herein by reference in its entirety including the specification, claims, drawings, and abstract.

TECHNICAL FIELD

The present disclosure relates to a drone system composed of a vehicle and a drone that captures an image of the vehicle, and to a method of capturing a scene of the traveling vehicle with the drone.

BACKGROUND

In recent years, various services that utilize drones have been proposed. Meanwhile, self-driving technology is being improved. Based on such background, there is proposed a drone coordination device that obtains motion planning for a self-driving vehicle and causes a drone to fly according to the planning (for example, see WO 2018/230680).

SUMMARY

In recent years, it has been desired, for example, to capture scenes where a vehicle is being driven. To this end, images of the traveling vehicle need to be captured from various angles, including, for example, from the side and the front of the vehicle. However, for the device disclosed in WO 2018/230680, although it can track or follow the traveling vehicle and capture images of it from the rear side, it cannot move around to the side or the front of the traveling vehicle to capture images.

Accordingly, an object of the present disclosure is to capture images of a traveling vehicle from various angles.

A drone system according to the present disclosure is a drone system including a vehicle and a drone that captures an image of the vehicle, and in this system, the vehicle is connected to the drone via a communication line and sends vehicle information including traveling information of the vehicle and navigation information of the vehicle to the drone, the drone is capable of autonomous flight and includes a camera for capturing an image and a controller for controlling flight and controlling the camera, and the controller includes a storage unit that stores a scene information database containing a plurality of scene information sets arranged in time series of a video to be captured, and in each of the scene information sets, a relative position with respect to the vehicle in capturing a scene of the video and a duration of the scene are associated with each other, a vehicle information acquisition unit that receives the vehicle information from the vehicle, a traveling position estimation unit that estimates a future traveling position of the vehicle based on the received vehicle information, and a flight path calculation unit that, based on the future traveling position of the vehicle estimated by the traveling position estimation unit and the scene information database, calculates, for each of the scenes, a flight path that passes through the relative position with respect to the vehicle.

As such, the drone captures an image of the vehicle while flying to pass through the relative position with respect to the vehicle for each of the scenes of the video. The drone can therefore capture images of the traveling vehicle from various directions in accordance with the scenes of the video while flying, for example, beside or in front of the vehicle.

In the drone system according to the present disclosure, the controller may include a camera control unit that captures the video while adjusting the direction of the camera based on the relative positions with respect to the vehicle stored in the scene information database.

This enables capturing of images of the traveling vehicle from various directions in accordance with the scenes of the video in a more detailed manner.

In the drone system according to the present disclosure, the scene information database contains a plurality of scene information sets arranged in time series of the video to be captured, and in each of the scene information sets, a scene of the video to be captured, the relative position with respect to the vehicle in capturing the scene, and the duration of the scene are associated with one another. The camera control unit may capture the video while adjusting the direction and angle of view of the camera based on an image captured by the camera and the scene.

This enables capturing of the video such that the plurality of scenes contained in the scene information database are connected smoothly.

In the drone system according to the present disclosure, the flight path calculation unit of the controller may calculate, based on the future traveling positions of the vehicle estimated by the traveling position estimation unit and the relative positions with respect to the vehicle stored in the scene information database, absolute positions of the relative positions with respect to the ground surface for capturing images of the scenes stored in the scene information database, and calculate a flight path that passes through the absolute position for each of the scenes stored in the scene information database.

As such, the drone calculates the absolute positions with respect to the ground surface, calculates a flight path that passes through the absolute position for each of the scenes, and flies according to the flight path. The drone can thus capture images of the traveling vehicle from various angles in a more reliable manner.

In the drone system according to the present disclosure, the traveling information of the vehicle may include speed information, acceleration information, braking information, and steering information.

This enables quick calculation of the future traveling position of the vehicle, and even when the traveling speed of the vehicle is fast, it can be ensured that the drone will fly to pass through the relative positions or the absolute positions with respect to the vehicle while capturing images of the scenes of the video.

In the drone system according to the present disclosure, the drone system may send image data of the captured video in real time, and the vehicle may receive the image data and display the video on a display in the vehicle.

This enables passengers in the vehicle to feel as if they are looking at their traveling vehicle while flying like a bird.

A vehicle image capturing method according to the present disclosure is a method of capturing an image of a vehicle using a drone, and in this method, the vehicle is connected to the drone via a communication line and sends vehicle information including traveling information of the vehicle and navigation information of the vehicle to the drone, the drone is capable of autonomous flight and includes a camera for capturing an image and a controller for controlling flight and controlling the camera, the controller includes a processor that performs information processing, and a storage unit that stores a scene information database containing a plurality of scene information sets arranged in time series of a video to be captured, in each of the scene information sets, a relative position with respect to the vehicle in capturing a scene of the video and a duration of the scene are associated with each other, and the processor receives the vehicle information from the vehicle, estimates a future traveling position of the vehicle based on the received vehicle information, calculates, for each of the scenes, a flight path that passes through the relative position with respect to the vehicle based on the estimated future traveling position of the vehicle and the scene information database, and causes the drone to fly based on the calculated flight path and captures an image of the vehicle with the camera.

Thus, the drone is caused to capture an image of the vehicle while flying to pass through the relative position with respect to the vehicle for each of the scenes of the video. The drone can therefore capture images of the traveling vehicle from various directions in accordance with the scenes of the video while flying, for example, beside or in front of the vehicle.

A drone system according to the present disclosure is a drone system including a vehicle, a drone that captures an image of the vehicle, and a drone operation center that operates the drone, and in this system, the vehicle is connected to the drone operation center via a communication line and sends vehicle information including traveling information of the vehicle and navigation information of the vehicle to the drone operation center, the drone is capable of autonomous flight and includes a camera for capturing an image and a controller for controlling flight and controlling the camera, the drone is connected to the drone operation center via a communication line and sends a current flight position to the drone operation center, the drone operation center includes a server, the server includes a storage unit that stores a scene information database containing a plurality of scene information sets arranged in time series of a video to be captured, in each of the scene information sets, a relative position with respect to the vehicle in capturing a scene of the video and a duration of the scene are associated with each other, a vehicle information acquisition unit that receives the vehicle information from the vehicle, a traveling position estimation unit that estimates a future traveling position of the vehicle based on the received vehicle information, and a flight path calculation unit that, based on the current flight position of the drone received from the drone, the future traveling position of the vehicle estimated by the traveling position estimation unit, and the scene information database, calculates, for each of the scenes, a flight path that passes through the relative position with respect to the vehicle and sends the result to the drone, and the drone captures an image of the vehicle with the camera while flying autonomously according to the flight path received from the server.

As such, calculation of the flight path is carried out by the server of the drone operation center, and it is thus possible to calculate the flight path quickly and capture images of the traveling vehicle from various directions in accordance with the scenes of the video. The size of electronic devices mounted on the drone can also be reduced, and therefore, the weight of the drone can also be reduced, thereby achieving a compact system.

The present disclosure enables capturing images of a traveling vehicle from various angles.

BRIEF DESCRIPTION OF DRAWINGS

Embodiments of the present disclosure will be described based on the following figures, wherein:

FIG. 5 is a diagram showing a data structure of a scene information database stored in a storage unit shown in FIG. 3;

DESCRIPTION OF EMBODIMENTS

Figure 1:
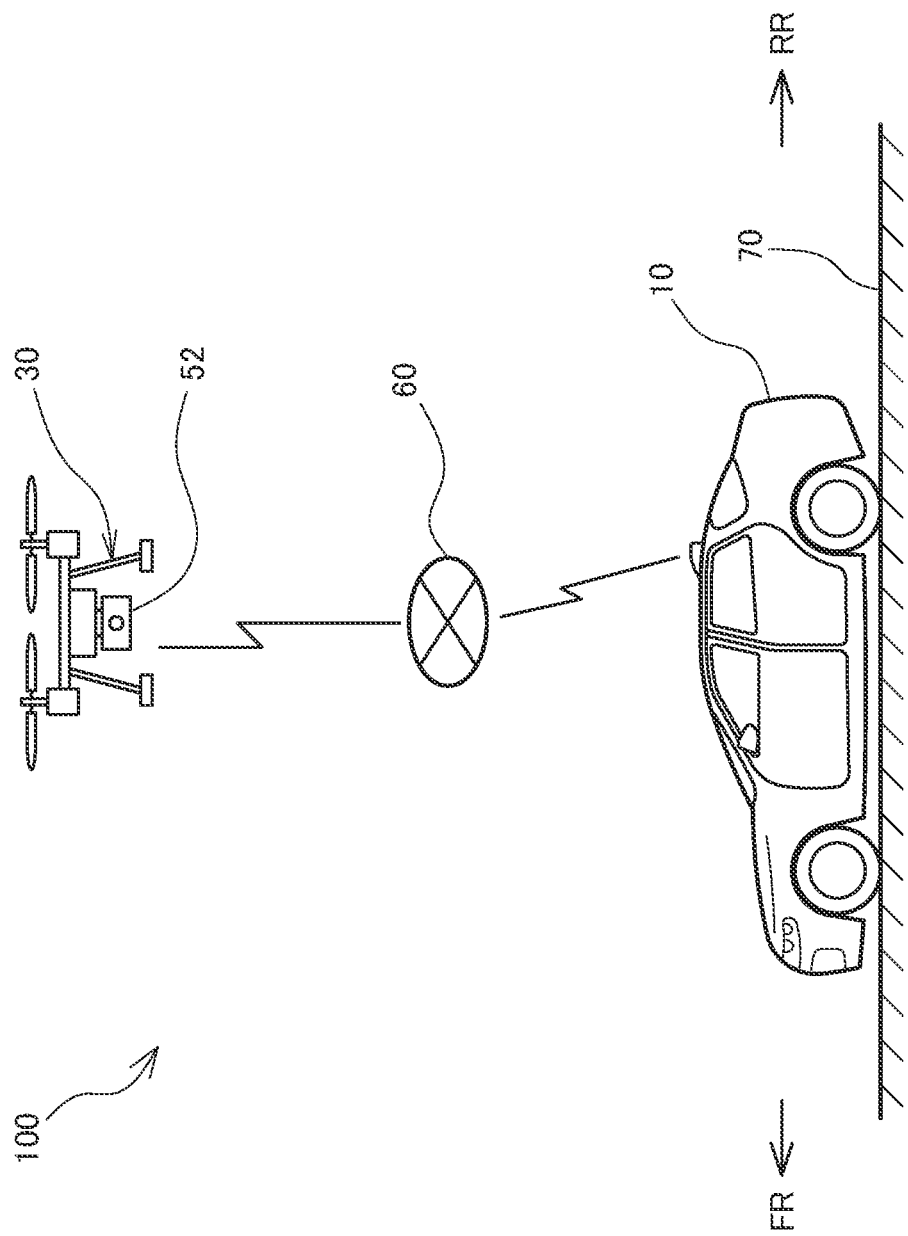
FIG. 1 is a system diagram showing a structure of a drone system according to an embodiment.

Hereinafter, a drone system 100 according to an embodiment will be described with reference to the drawings. As shown in FIG. 1, the drone system 100 is composed of a vehicle 10 and a drone 30. The vehicle 10 and the drone 30 are connected via a communication line 60, such as the Internet. The vehicle 10 sends vehicle information including traveling information of the vehicle 10 and navigation information of the vehicle 10 to the drone 30. The drone 30 is capable of autonomous flight and is equipped with a camera 52 for image capturing. In the drawings, FR and RR respectively indicate the front side and the rear side of the vehicle 10, and LH and RH respectively indicate the left side and the right side of the vehicle 10. In addition, although, in the following description, the drone 30 will be described as an object flying by motor-driven propellers, the motor may be driven by an engine, and the drone 30 may be an aircraft having, for example, a jet engine or a rocket engine as a driving mechanism, as long as it is an unmanned flying object that can fly autonomously.

Structure of Vehicle

Figure 2:
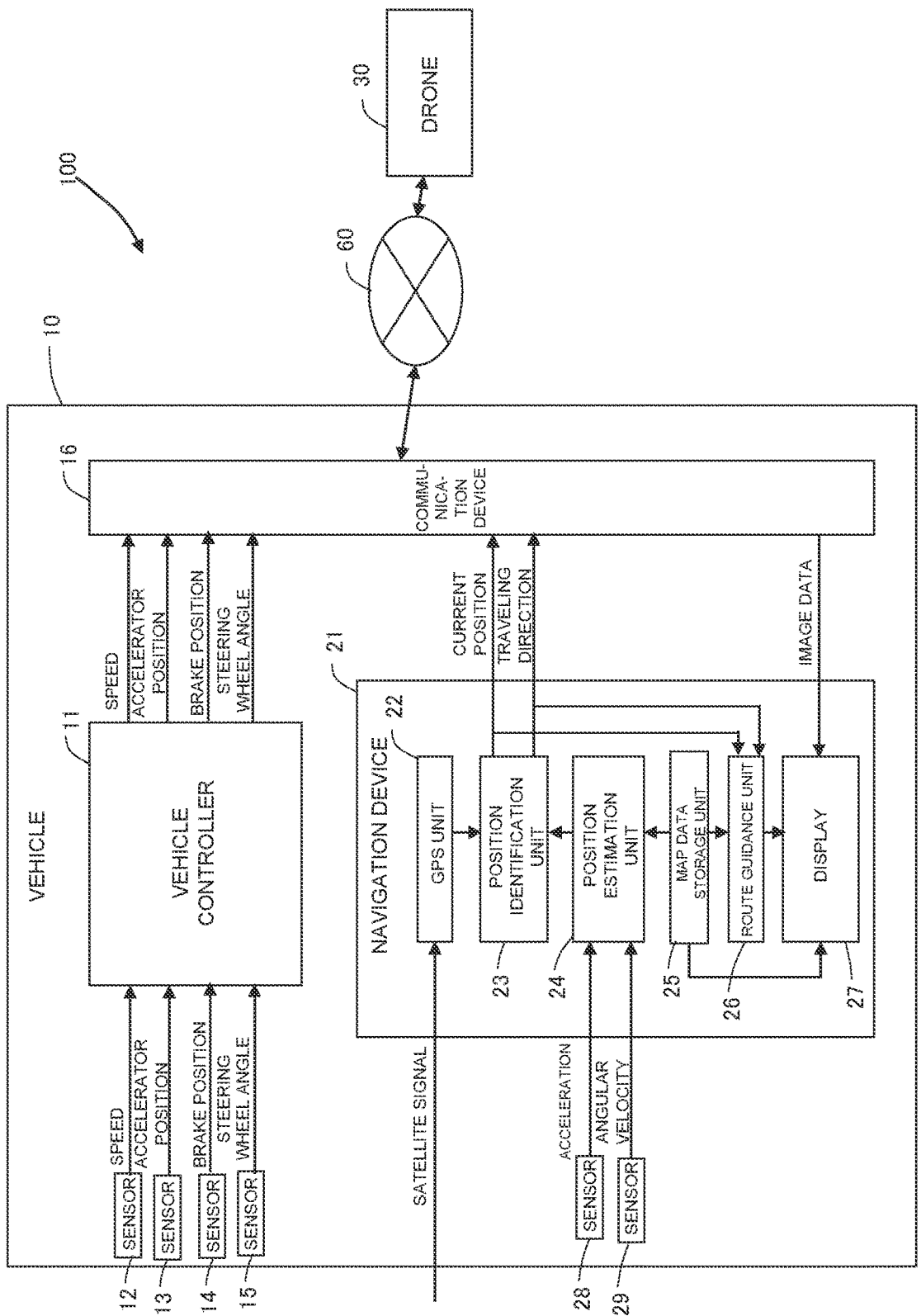
FIG. 2 is a functional block diagram of a vehicle constituting the drone system according to the embodiment.

As shown in FIG. 2, the vehicle 10 includes a vehicle controller 11 for controlling traveling of the vehicle 10, a navigation device 21 for identifying a current position of the vehicle 10 and guiding a route to a destination of the vehicle 10, and a communication device 16 connected to the vehicle controller 11 and the navigation device 21, for communicating with the communication line 60.

The vehicle controller 11 is a device that receives, as inputs, measurement data from a speed sensor 12, an accelerator position sensor 13, a brake position sensor 14, and a steering angle sensor 15 and controls the engine or the motor and a steering apparatus of the vehicle 10 to control traveling of the vehicle 10, including, for example, control of acceleration, deceleration, and steering. The vehicle controller 11 outputs, to the communication device 16, traveling information of the vehicle 10 including speed information, acceleration information, braking information, and steering information that are respectively input from the speed sensor 12, the accelerator position sensor 13, the brake position sensor 14, and the steering angle sensor 15.

The navigation device 21 includes five functional blocks, that is, a GPS unit 22, a position identification unit 23, a position estimation unit 24, a map data storage unit 25, and a route guidance unit 26, and a display 27.

The GPS unit 22 receives a plurality of radio waves from a plurality of satellites and outputs information about the longitude and latitude of a current position of the vehicle 10 based on the received radio waves.

The position estimation unit 24 estimates the latitude and longitude of a current position of the vehicle 10 based on the measurements from an acceleration sensor 28 and an angular velocity sensor 29 attached to the vehicle 10 and map information stored in the map data storage unit 25, and outputs the estimation results to the position identification unit 23.

If the GPS unit 22 can receive radio waves from the plurality of satellites and output accurate latitude and longitude information, the position identification unit 23 then outputs the latitude and longitude input from the GPS unit 22 as latitude and longitude information of the current position of the vehicle 10. Meanwhile, when the GPS unit 22 cannot receive radio waves from the plurality of satellites, the position identification unit 23 then outputs the latitude and longitude input from the position estimation unit 24 as latitude and longitude information of the current position of the vehicle 10, to the communication device 16 and the route guidance unit 26. The position identification unit 23 also calculates a traveling direction of the vehicle 10 based on temporal changes in latitude and longitude of the current position and outputs the result to the communication device 16 and the route guidance unit 26. The latitude and longitude information of the current position and the information about the traveling direction output from the position identification unit 23 constitute the navigation information.

The route guidance unit 26 calculates a route to the destination based on the map information stored in the map data storage unit 25, the latitude and longitude information of the current position of the vehicle 10, and the traveling direction information output from the position identification unit 23, together with information about the destination input by the user, and displays the resulting route on the display 27 so as to superimpose it on the map data of the vicinity of the current position. The display 27 also displays image data input from the communication device 16.

The communication device 16 sends, to the drone 30, the traveling information including the speed information, the acceleration information, the braking information, and the steering information input from the vehicle controller 11, together with the navigation information including the latitude and longitude data of the current position of the vehicle 10 and the traveling direction data input from the navigation device 21, via the communication line 60.

Structure of Drone

Figure 3:
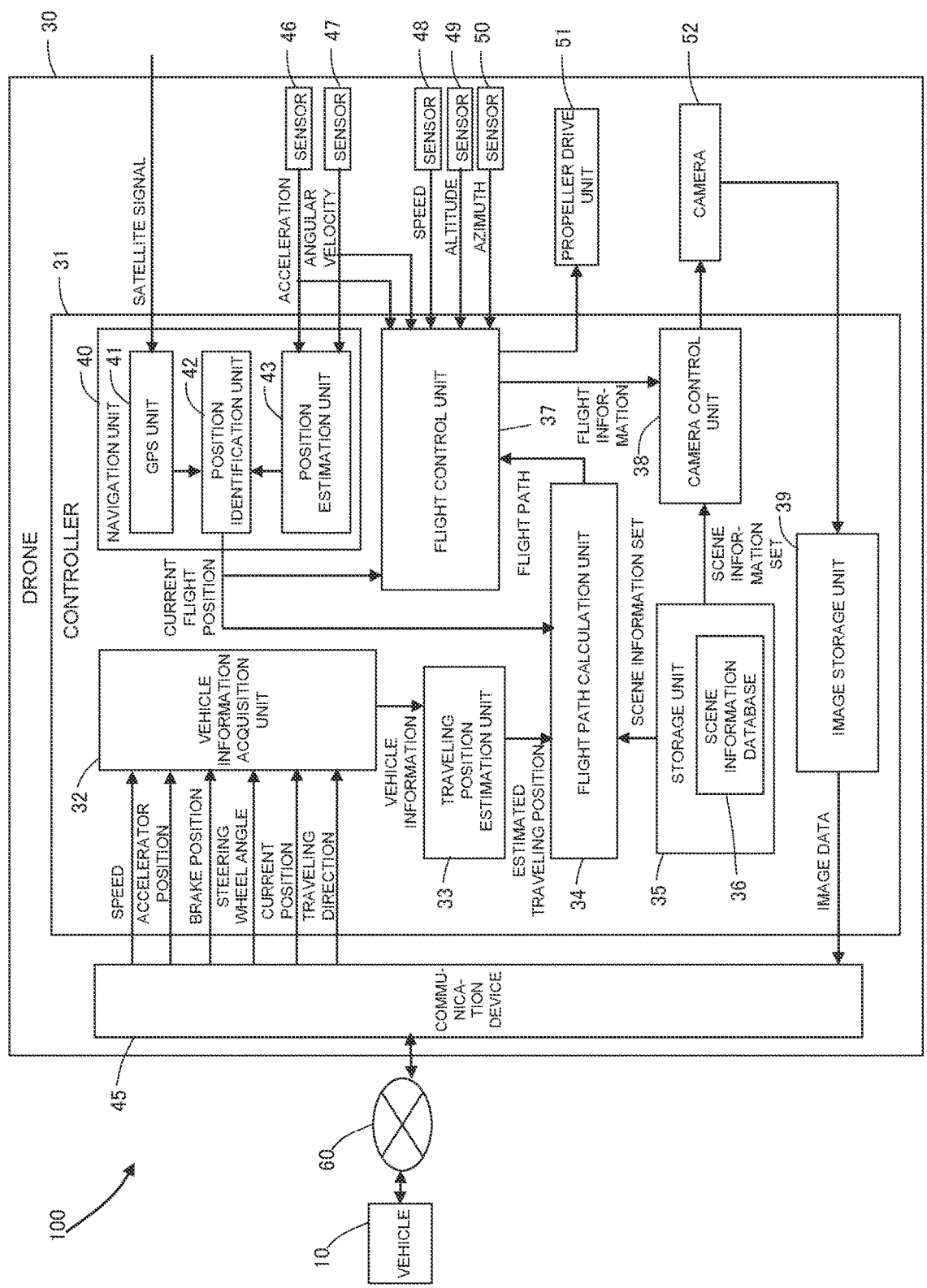
FIG. 3 is a functional block diagram of a drone constituting the drone system according to the embodiment.

The drone 30 is a flying object that flies autonomously by driving a plurality of propellers with a motor and is capable of flying in the vertical direction, in the front-and-rear direction, and in the right-and-left direction by changing the rotational speed and the angle of the plurality of propellers. As shown in FIG. 3, the drone 30 includes a controller 31 for controlling flight and controlling the camera 52, and a communication device 45 connected to the vehicle controller 31 and communicating with the communication line 60. The controller 31 includes eight functional blocks, that is, a vehicle information acquisition unit 32, a traveling position estimation unit 33, a flight path calculation unit 34, a storage unit 35, a flight control unit 37, a camera control unit 38, a navigation unit 40, and an image storage unit 39.

The vehicle information acquisition unit 32 of the controller 31 acquires, from the communication device 45, the vehicle information including the traveling information that includes the speed information, the acceleration information, the braking information, and the steering information, and the navigation information that includes the latitude and longitude data of the current position and the traveling direction data of the vehicle 10 received by the communication device 45 from the vehicle 10 via the communication line 60, and outputs the information to the traveling position estimation unit 33.

The traveling position estimation unit 33 estimates a future traveling position of the vehicle 10 based on the vehicle information input from the vehicle information acquisition unit 32 and outputs latitude and longitude information of the estimated traveling position to the flight path calculation unit 34.

The storage unit 35 stores data for flight control and camera control. The storage unit 35 also stores a scene information database 36. As shown in FIG. 5, the scene information database 36 contains a plurality of scene information sets 36a arranged in time series of a video to be captured, and in each of the scene information sets 36, a scene of the video, a relative position with respect to the vehicle 10 in capturing the scene, and a duration of the scene are associated with one another. The scene information database 36 will be described later with reference to FIGS. 5 to 11. It is also possible to adopt a scene information database 36 that stores a plurality of scene information sets 36a arranged in time series of a video to be captured, in each of which no data of a scene of the video is included, and a relative position with respect to the vehicle 10 in capturing the scene of the video and a duration of the scene are associated with each other.

The flight path calculation unit 34 calculates, based on the estimated future traveling position of the vehicle 10 estimated by the traveling position estimation unit 33 and the scene information database 36, a flight path that passes through a relative position of the drone 30 with respect to the vehicle 10, which is stored in the scene information database 36. The operation of the flight path calculation unit 34 will be described later with reference to FIGS. 12 to 14.

Like the navigation device 21 of the vehicle 10 described above, the navigation unit 40 includes a GPS unit 41, a position estimation unit 43, and a position identification unit 42. The GPS unit 41 receives a plurality of radio waves from a plurality of satellites and outputs longitude and latitude information of a current position based on the received radio waves. The position estimation unit 43 estimates the latitude and longitude of the current position of the drone 30 based on the measurements from an acceleration sensor 46 and an angular velocity sensor 47 attached to the drone 30 and outputs the results to the position identification unit 42. Like the position identification unit 23 of the navigation device 21 of the vehicle 10, the position identification unit 42 identifies the latitude and longitude of the current flight position of the drone 30 based on the current position input from the GPS unit 41 and the position estimation unit 43 and outputs data of the latitude and longitude of the current flight position to the flight path calculation unit 34 and the flight control unit 37.

The flight control unit 37 adjusts a propeller drive unit 51 to control flight of the drone 30 based on the data of the latitude and longitude of the current flight position input from the position identification unit 42 of the navigation unit 40, the flight path input from the flight path calculation unit 34, and acceleration data, angular velocity data, speed data, altitude data, and azimuth data respectively measured by the acceleration sensor 46, the angular velocity sensor 47, a speed sensor 48, an altitude sensor 49, and an azimuth sensor 50.

The camera control unit 38 controls the direction and angle of view of the camera 52 based on the flight information including the speed data, the altitude data, and the azimuth data input from the flight control unit 37 and the scene information sets 36a of the scene information database 36 stored in the storage unit 35. The operation of the camera control unit 38 will be described later with reference to FIGS. 12 to 14.

Figure 4:
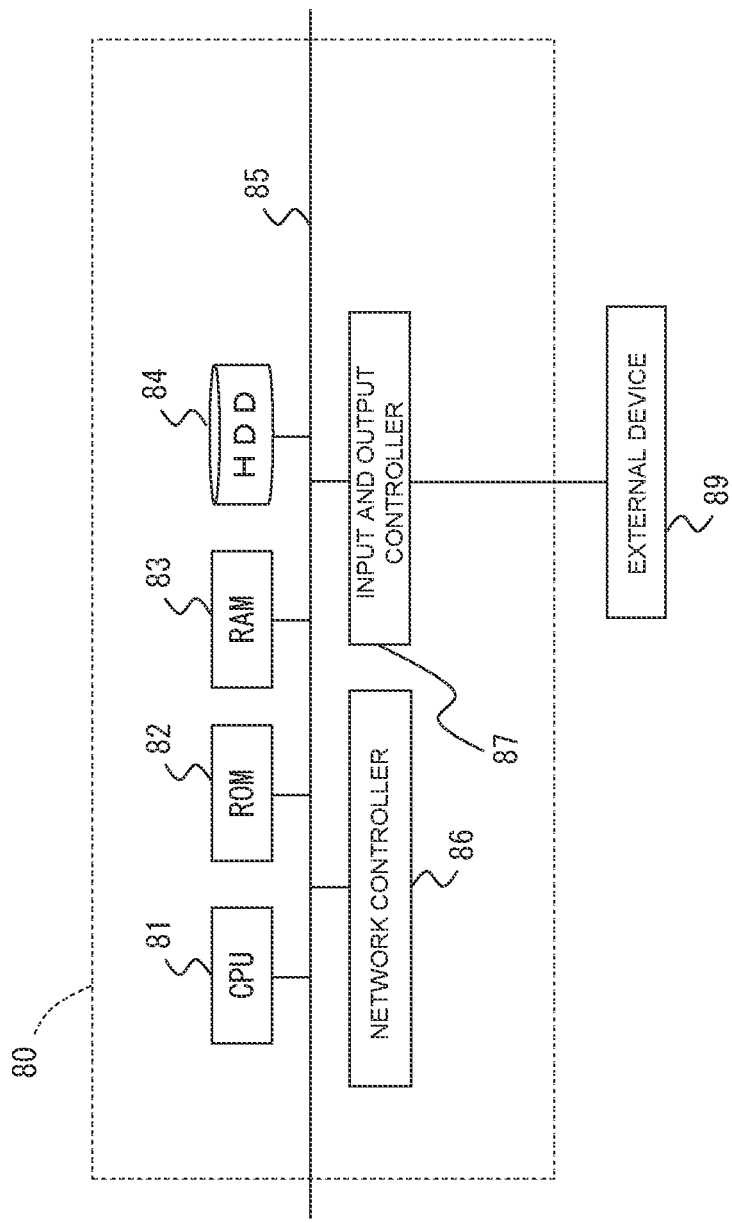
FIG. 4 is a hardware configuration diagram of a computer constituting a vehicle controller and a navigation device for the vehicle shown in FIG. 2 and a controller for the drone shown in FIG. 3.

The above vehicle controller 11, the GPS unit 22, the position identification unit 23, the position estimation unit 24, the map data storage unit 25, and the route guidance unit 26 of the navigation device 21 shown in FIG. 2, and the functional blocks of the vehicle information acquisition unit 32, the traveling position estimation unit 33, the flight path calculation unit 34, the storage unit 35, the flight control unit 37, the camera control unit 38, the navigation unit 40, and the image storage unit 39 of the controller 31 shown in FIG. 3 can each be implemented by a general purpose computer 80 shown in FIG. 4.

As shown in FIG. 4, the general purpose computer 80 includes a CPU 81 that is a processor for performing information processing, a ROM 82 and a RAM 83 for temporarily storing data during information processing, a hard disk drive (HDD) 84 for storing, for example, programs and user data, a data bus 85 for connecting them together, a network controller 86 connected to the data bus 85, and an input and output controller 87. The input and output controller 87 is connected to an external device 89, such as a sensor and a display.

The vehicle controller 11, the GPS unit 22, the position identification unit 23, the position estimation unit 24, and the route guidance unit 26 of the navigation device 21 of the vehicle 10, and the vehicle information acquisition unit 32, the traveling position estimation unit 33, the flight path calculation unit 34, the flight control unit 37, the camera control unit 38, and the navigation unit 40 of the drone 30 can each be implemented by cooperative operation between the hardware of the general purpose computer 80 and a program that runs on the CPU 81 shown in FIG. 4. In addition, the map data storage unit 25 of the navigation device 21, and the storage unit 35 and the image storage unit 39 of the controller 31 of the drone 30 can each be implemented by the HDD 84 of the general purpose computer 80 shown in FIG. 4. In place of the HDD 84, it is also possible to use a storage device such as an SSD or use external storage devices via the network.

Scene Information Database

Next, the scene information database 36 will be described with reference to FIG. 5. The scene information database 36 contains the plurality of scene information sets 36a arranged in time series of a video to be captured, and in each of the scene information sets 36, a scene of the video to be captured, a relative position with respect to the vehicle 10 in capturing the scene, and a duration of the scene are associated with one another. Here, the relative position with respect to the vehicle 10 means a group of relative positions including a relative position of the drone 30 with respect to the vehicle 10 in the vehicle front-and-rear direction, a relative position of the drone 30 with respect to the vehicle 10 in the vehicle right-and-left direction, and a relative position of the drone 30 with respect to the vehicle 10 in the vehicle height direction. As shown in FIG. 5, each scene information set 36a is a set including a number, a scene, relative positions of the drone 30 with respect to the vehicle 10 in the vehicle front-and-rear direction, in the vehicle right-and-left direction, and in the vehicle height direction in capturing the scene, and a duration of the scene. The numbers are given in time series of scenes of the video to be captured.

Figure 6:
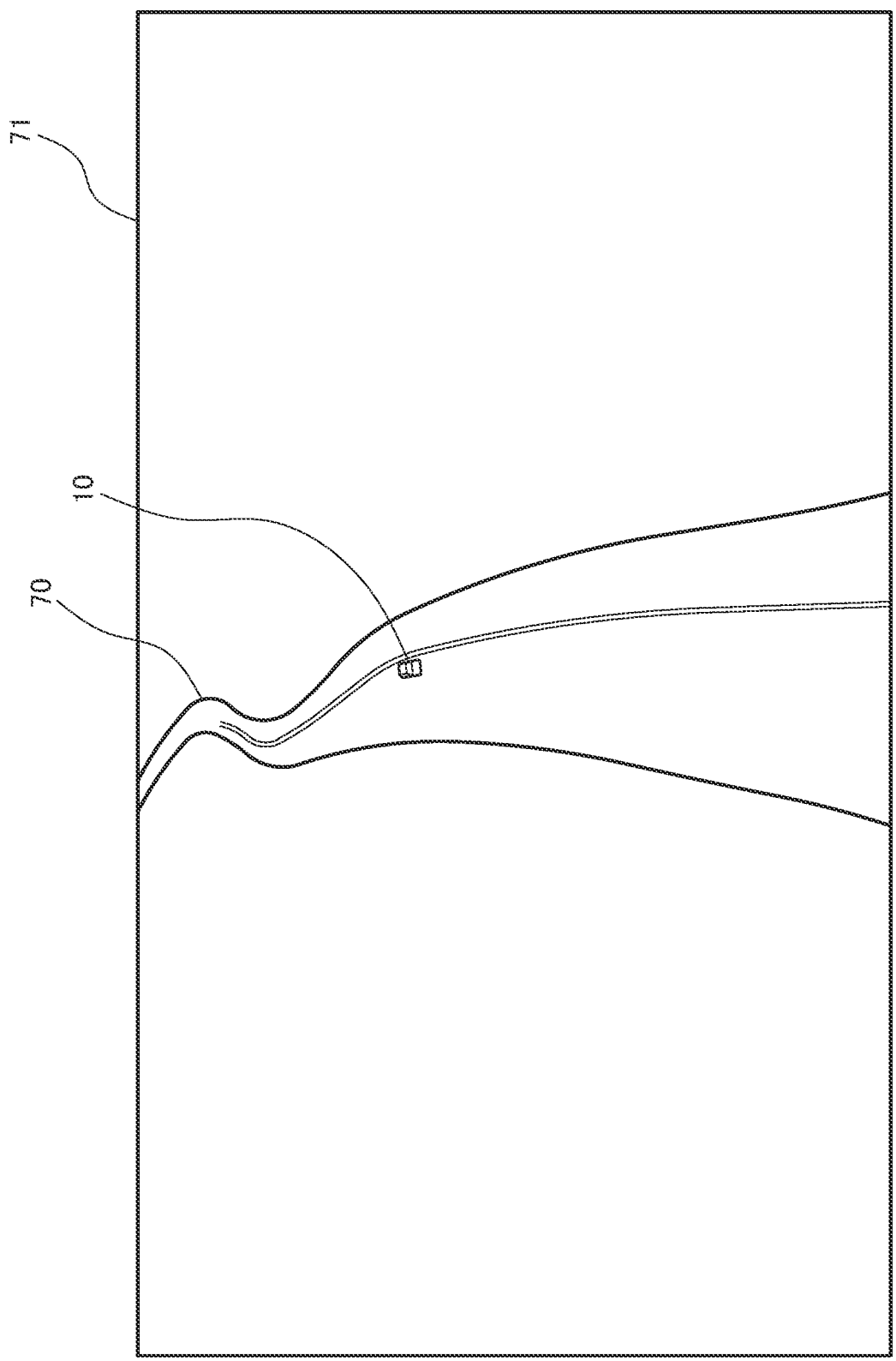
FIG. 6 is an image of a scene 71 of Number 001 in the scene image database shown in FIG. 5.
Figure 7:
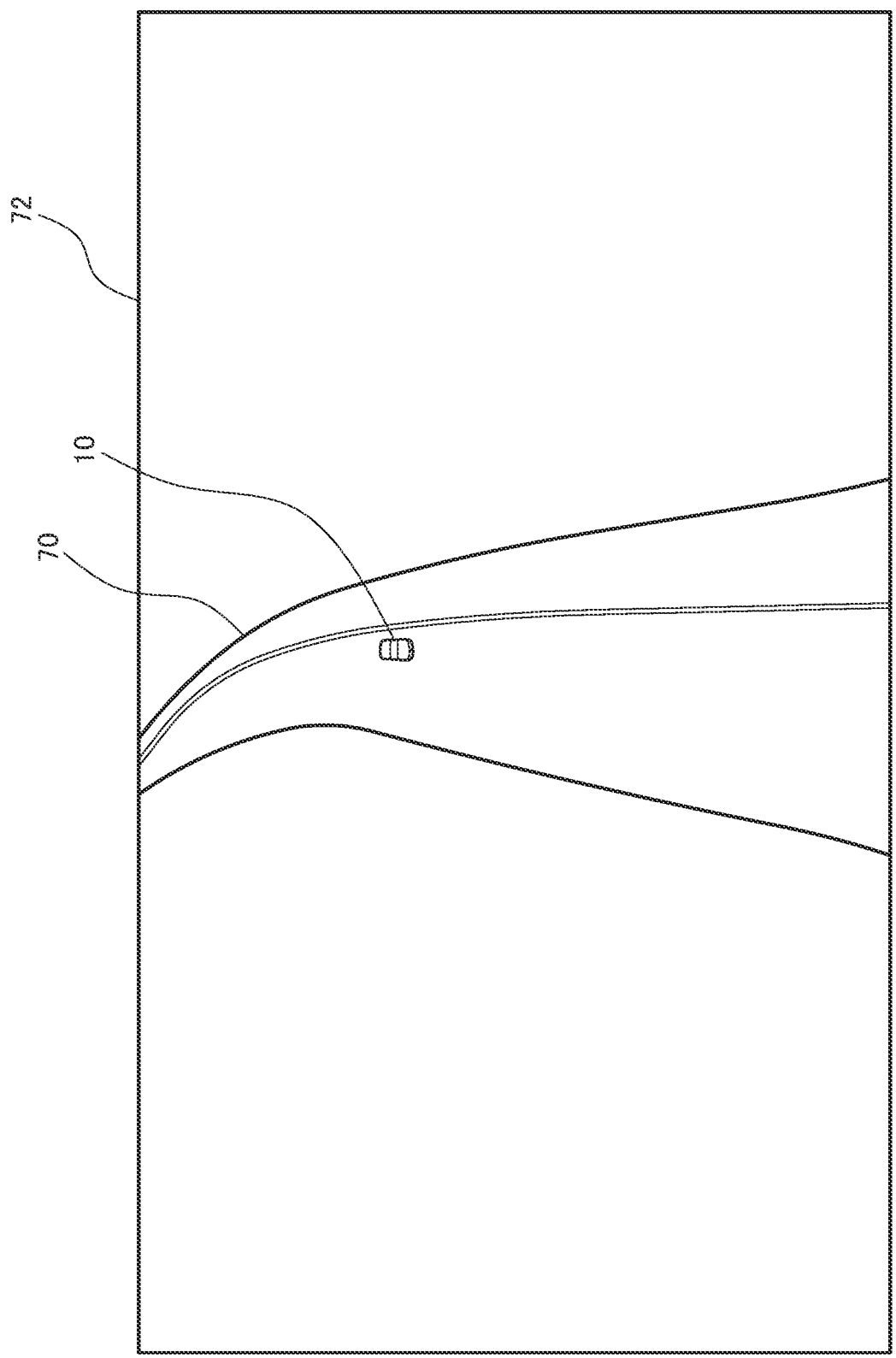
FIG. 7 is an image of a scene 72 of Number 002 in the scene image database shown in FIG. 5.
Figure 8:
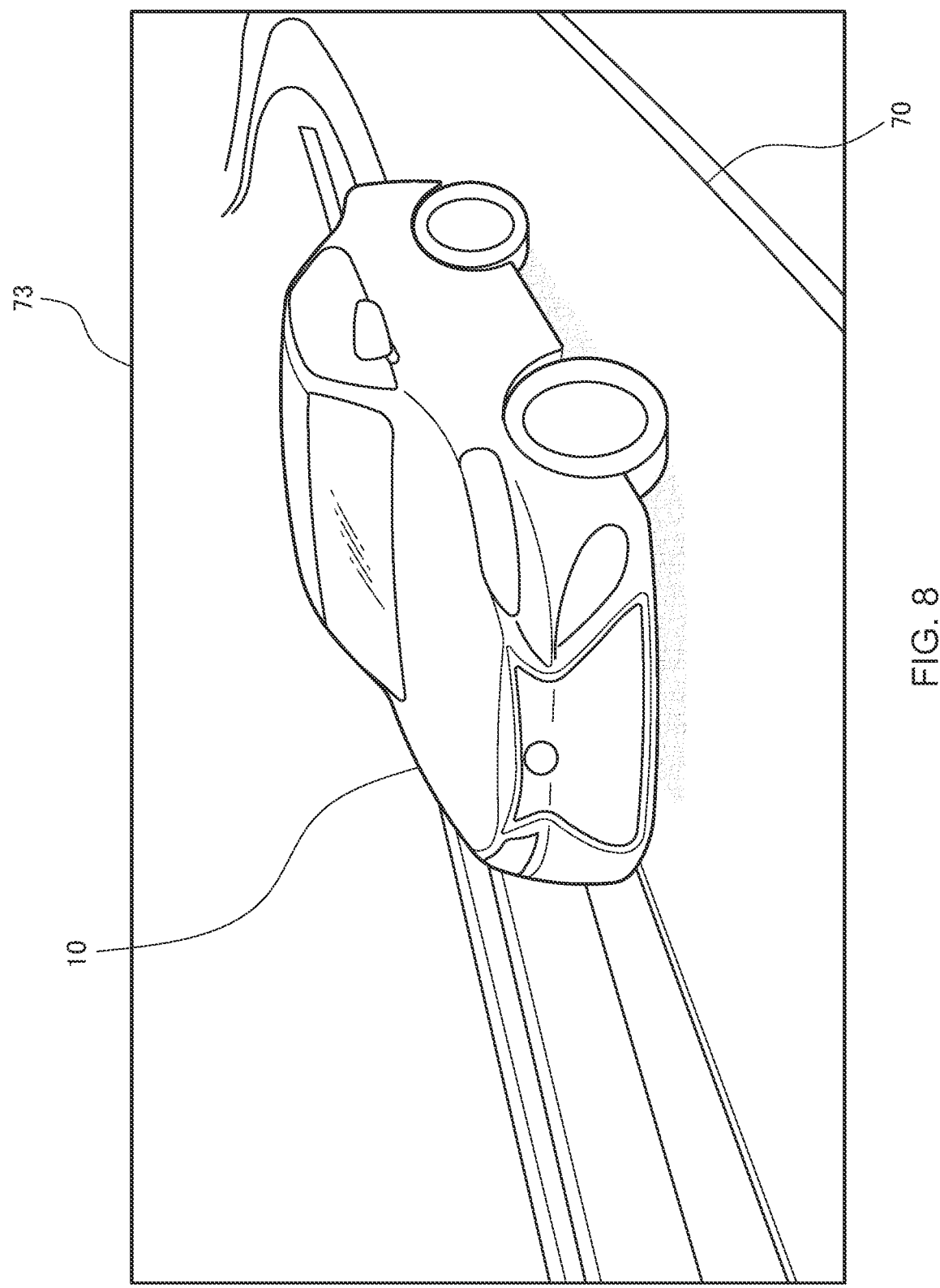
FIG. 8 is an image of a scene 73 of Number 003 in the scene image database shown in FIG. 5.
Figure 9:
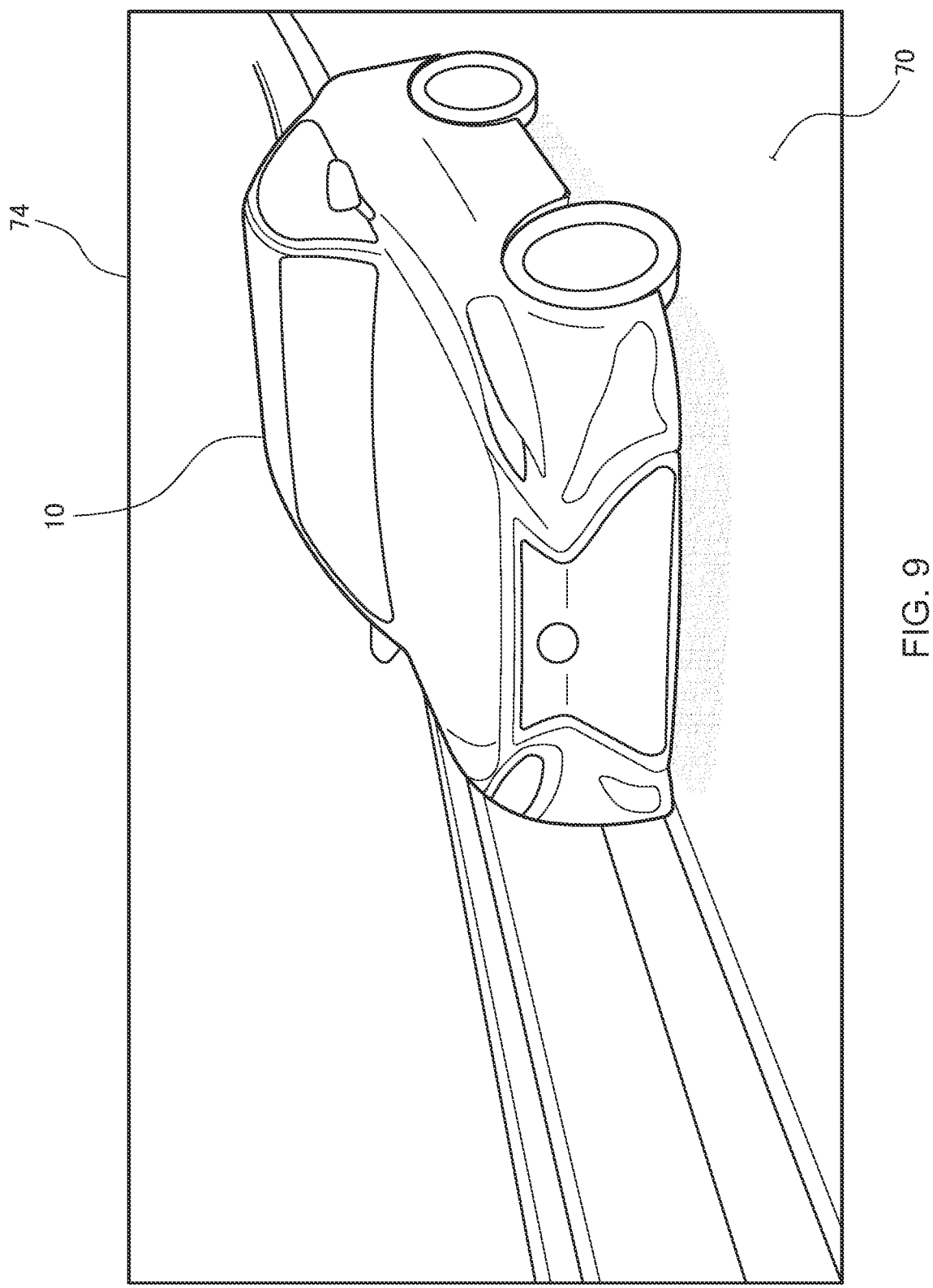
FIG. 9 is an image of a scene 74 of Number 004 in the scene image database shown in FIG. 5.
Figure 10:
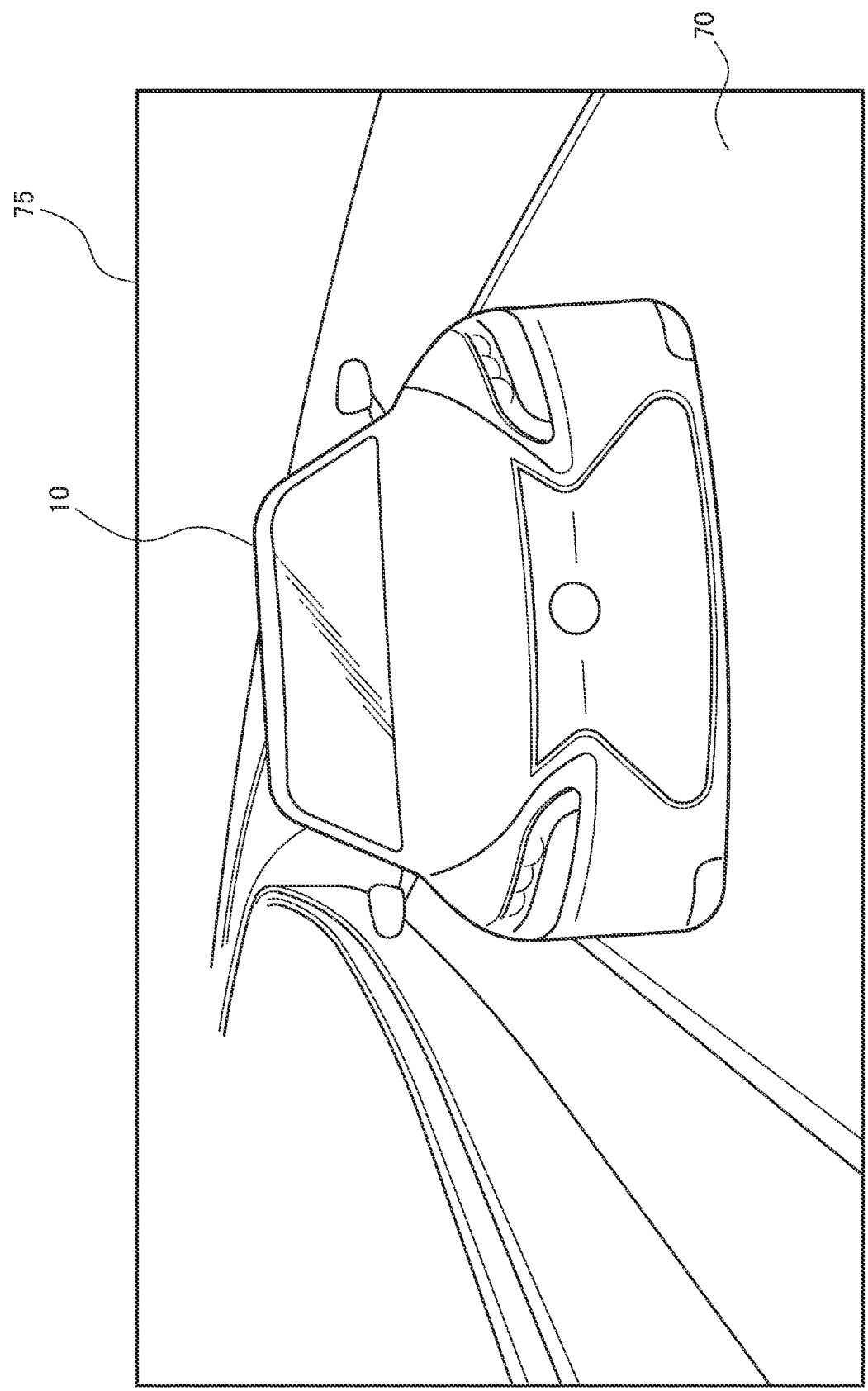
FIG. 10 is an image of a scene 75 of Number 005 in the scene image database shown in FIG. 5.

A specific example of the scene information database 36 will now be described. Here, a description will be given for the case where a video including five scenes 71 to 75 which are as shown in FIGS. 6 to 10 is captured. The video starts from the scene 71 where a road 70 and the vehicle 10 traveling on the road 70 are looked down on from the sky in front of the vehicle 10 as shown in FIG. 6, and then proceeds to the scene 72 in which the vehicle 10 approaches as shown in FIG. 7. Then, as shown in FIGS. 8 to 10, the video proceeds from the scene 73 where an image of the traveling vehicle 10 is captured from the side of the vehicle 10 to the scenes 74 and 75 captured while the drone 30 gradually moves around to the front of the vehicle 10.

Figure 11:
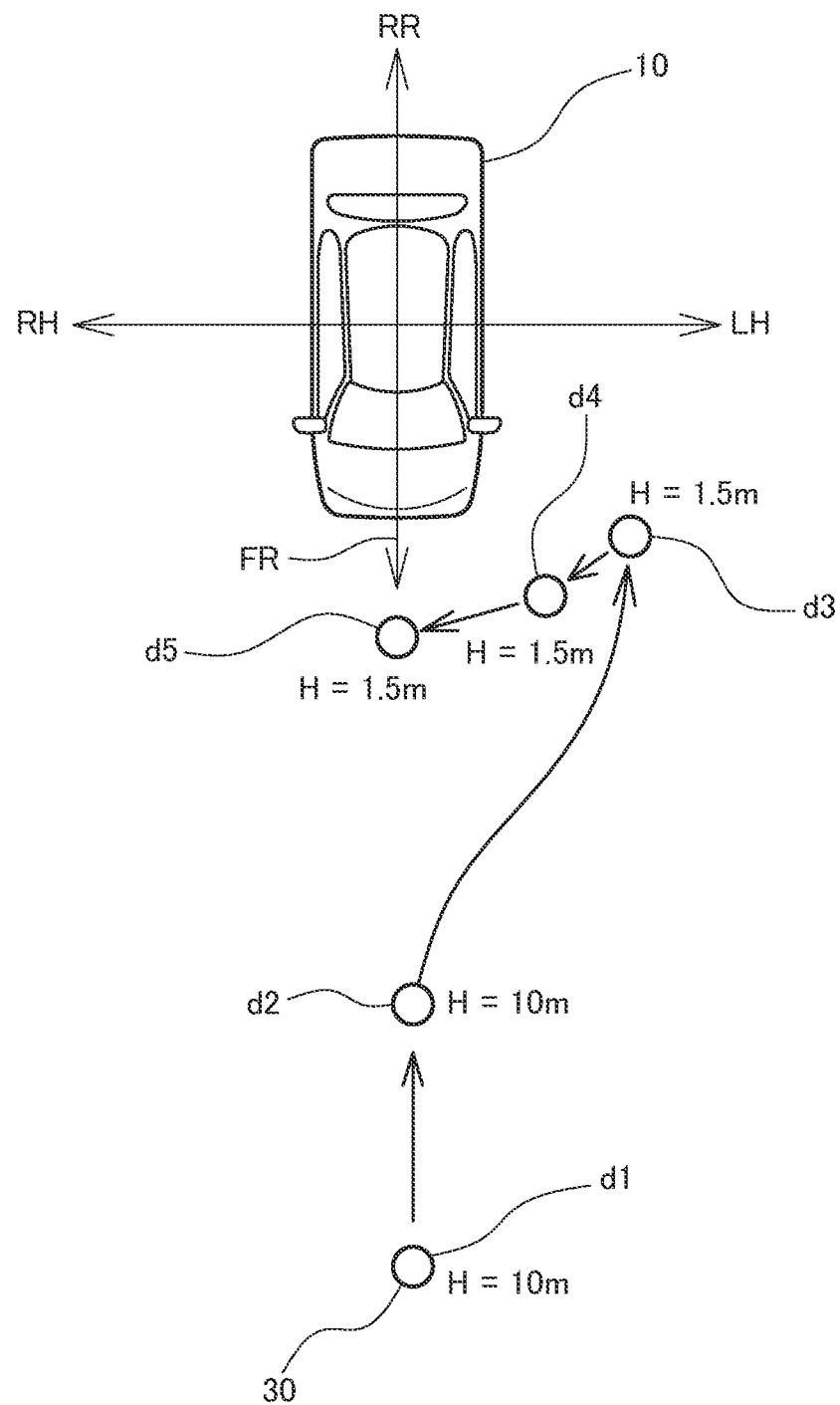
FIG. 11 is a plan view showing relative positions with respect to the vehicle for the numbers in the scene image database in FIG. 5.

FIG. 11 shows temporal changes in relative position of the drone 30 with respect to the vehicle 10 for capturing such scenes 71 to 75. White circles in FIG. 11 indicate relative positions of the drone 30 with respect to the vehicle 10. The first scene 71 shown in FIG. 6 is a scene where the road 70 and the vehicle 10 traveling on the road 70 are looked down on from the sky in front of the vehicle 10, and at this time, the drone 30 captures an image of the vehicle 10 while flying at a relative position d1 which is at a position 100 m in front of the center of the vehicle 10 and at an altitude of 10 m from the road 70. Here, the distances from the vehicle 10 along the front-and-rear direction and the right-and-left direction are distances from the center of the plane of the vehicle 10 as shown in FIG. 11. Next, to capture the scene 72 shown in FIG. 7, the drone 30 captures an image of the vehicle 10 while flying at a relative position d2 which is closer to the front of the vehicle 10 than the relative position d1. The relative position d2 is at a position 30 m in front of the center of the vehicle 10 and at an altitude of 10 m from the road 70. At this time, the duration of the scene 71 is a period until the image at the start of image capturing for the scene 71 is changed to the image of the scene 72.

Further, for the scene 73 shown in FIG. 8, to capture an image of the vehicle 10 from the side of the traveling vehicle 10, the drone 30 captures an image of the vehicle 10 from the left side of the vehicle 10 while flying at a position located 3 m in front of the vehicle 10, 5 m on the left side of the vehicle 10, and at an altitude of 1.5 m. Then, to capture the scene 74 shown in FIG. 9 and the scene 75 shown in FIG. 10, the drone 30 flies, in front of the vehicle 10, from the relative position d3 to the relative position d4 and then to the relative position d5 so as to move around from the left side toward the front of the vehicle 10 at an altitude of 1.5 m. It thus captures images of the scenes 74 and 75. Image capturing is performed such that the scenes 73 to 75 start to be captured successively at intervals that are their respective predetermined durations. Here, the relative position d4 is a position located 12 m in front of the vehicle 10, 1 m on the left side of the vehicle 10, and at an altitude of 1.5 m, and the relative position d5 is a position located 13 m in front of the center of the vehicle 10 and at an altitude of 1.5 m.

As such, the drone 30 is caused to fly to pass through the relative positions d1 to d5 of the drone 30 with respect to the vehicle 10 at intervals that are the respective durations of the scenes 71 to 75, and the drone 30 can thus capture a video in which the scenes 71 to 75 shown in FIGS. 6 to 10 are successive.

In the case of capturing such a video, a scene information set 36a of Number 001 in the scene information database 36 shown in FIG. 5 stores the scene 71 shown in FIG. 6, relative positions in the vehicle front-and-rear direction, in the vehicle right-and-left direction, and in the vehicle height direction constituting the relative position d1 shown in FIG. 11, and a duration of AA seconds of the scene 71. The scene information set 36a of Number 001 stores, as the relative positions in the directions constituting the relative position d1, data indicating that the relative position in the vehicle front-and-rear direction is located 100 m in front of the vehicle 10, the relative position in the vehicle right-and-left direction is located at the center of the vehicle 10, and that the relative position in the vehicle height direction is located at an altitude of 10 m from the road surface. Similarly, a scene information set 36a of Number 002 stores the scene 72 shown in FIG. 7, relative positions in the vehicle front-and-rear direction, in the vehicle right-and-left direction, and in the vehicle height direction constituting the relative position d2 shown in FIG. 11, and a duration of BB seconds of the scene 72. The scene information set 36a of Number 002 stores, as the relative positions in the directions constituting the relative position d2, data indicating that the relative position in the vehicle front-and-rear direction is located 30 m in front of the vehicle 10, that the relative position in the vehicle right-and-left direction is located at the center of the vehicle 10, and that the relative position in the vehicle height direction is located at an altitude of 10 m from the road surface. Similarly, scene information sets 36a of Numbers 003 to 005 store the scenes 73 to 75 shown in FIGS. 8 to 10, relative positions in the vehicle front-and-rear direction, relative positions in the vehicle right-and-left direction, and relative positions in the vehicle height direction constituting the relative positions d3 to d5 shown in FIG. 11, and durations of CC to EE seconds of the scenes 73 to 75.

Operation of Capturing Video of Traveling Vehicle

Next, the operation of capturing a video of the traveling vehicle 10 by the drone system 100 according to the embodiment will be described with reference to FIGS. 12 and 14.

Figure 12:
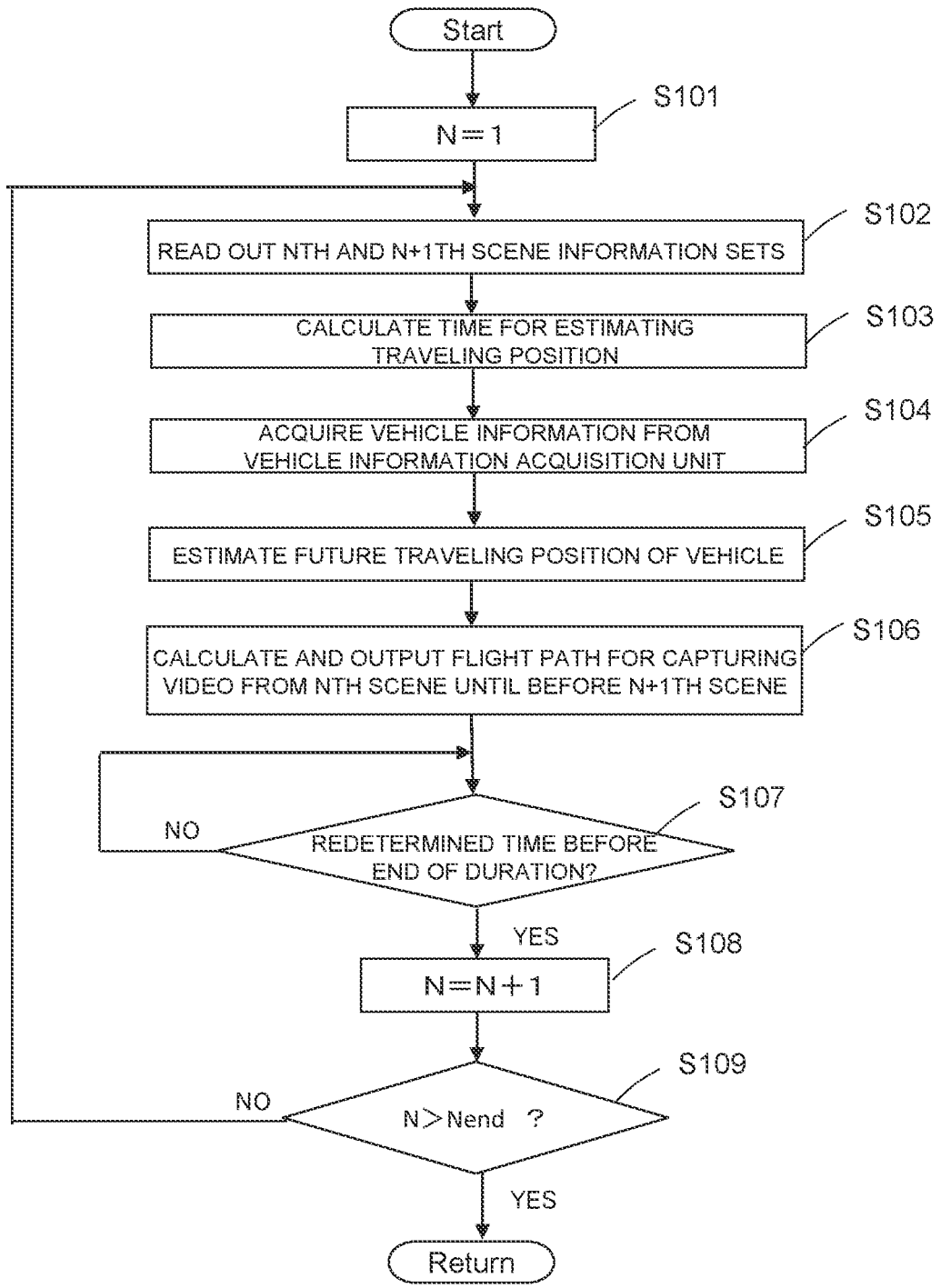
FIG. 12 is a flowchart of the operation of the drone system according to the embodiment.

As shown in step S101 in FIG. 12, the controller 31 of the drone 30 sets a counter N to an initial value of one. In step S102 in FIG. 12, the flight path calculation unit 34 of the controller 31 reads out the scene information sets 36a of Number 001 and Number 002 from the scene information database 36 stored in the storage unit 35. Then, in step S103 in FIG. 12, the flight path calculation unit 34 sets time t1 at which a video starts to be captured, calculates time t2 by adding the duration of AA seconds of Number 001 to the time t1, and outputs the result to the traveling position estimation unit 33. Here, the time t2 is end time of the scene 71 or start time of the scene 72, and the times t1 and t2 are times at which traveling positions are estimated.

In step S104 in FIG. 12, the vehicle information acquisition unit 32 acquires, from the vehicle 10, the vehicle information including the traveling information that includes the speed information, the acceleration information, the braking information, and the steering information, together with the navigation information that includes the latitude and longitude data of the current position and the traveling direction data, and outputs the information to the traveling position estimation unit 33.

Figure 14:
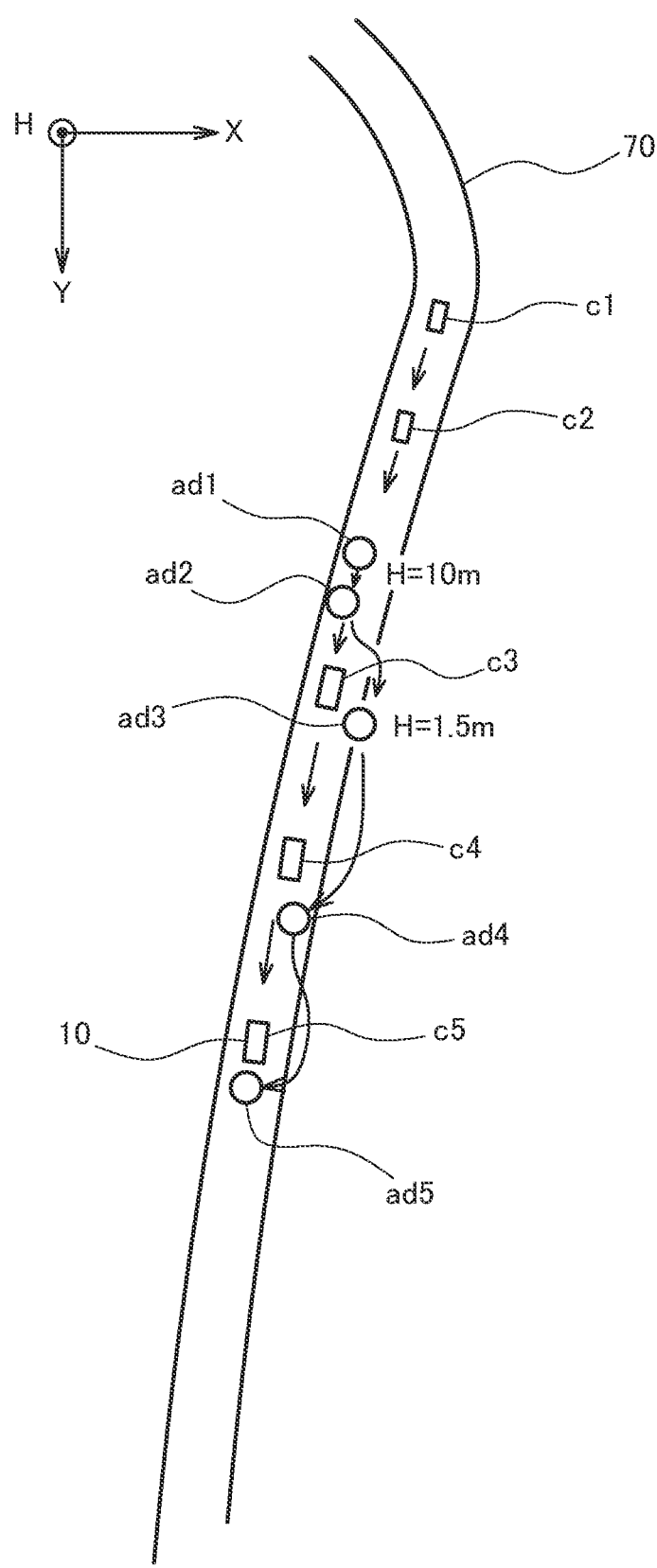
FIG. 14 is a plan view showing temporal changes in estimated position of the vehicle and absolute position of the drone with respect to the ground surface when the flowcharts shown in FIGS. 12 and 13 are implemented.

In step 105 in FIG. 12, the traveling position estimation unit 33 of the controller 31 calculates the latitude and longitude of the traveling positions c1 and c2 of the vehicle 10 at the times t1 and t2 shown in FIG. 14 based on the vehicle information including the traveling information and the navigation information input from the vehicle information acquisition unit 32, and outputs the results to the flight path calculation unit 34.

In step S106 in FIG. 12, the flight path calculation unit 34 calculates an absolute position ad1 corresponding to the relative position d1 shown in FIG. 11 with respect to the ground surface as shown in FIG. 14, based on the latitude and longitude of the traveling position c1 of the vehicle 10 at the time t1 and the relative positions of the drone 30 in the vehicle front-and-rear direction, in the vehicle right-and-left direction, and in the vehicle height direction with respect to the vehicle 10 in the scene information set 36a of Number 001, that is, information about the relative position d1 shown in FIG. 11. Here, the absolute position ad1 is defined by the latitude and longitude. Similarly, the flight path calculation unit 34 calculates an absolute position ad2 corresponding to the relative position d2 with respect to the ground surface as shown in FIG. 14, based on the latitude and longitude of the traveling position c2 of the vehicle 10 at the time t2 and the relative positions of the drone 30 in the vehicle front-and-rear direction, in the vehicle right-and-left direction, and in the vehicle height direction with respect to the vehicle 10 in the scene information set 36a of Number 002, that is, information of the relative position d2 shown in FIG. 11. The flight path calculation unit 34 then calculates a flight path of the drone 30 such that the drone 30 moves between the absolute positions ad1 and ad2 in the duration of AA seconds of Number 001 and outputs the result to the flight control unit 37. This flight path is a flight path for capturing a video from the scene 71 of Number 001 until before the scene 72 of Number 002. Here, the flight path may be a straight line connecting the absolute positions ad1 and ad2.

The flight path calculation unit 34 of the controller 31 of the drone 30 waits until a predetermined time period before the end of the duration of AA seconds of Number 001 as shown in step S107 in FIG. 12 and increments the counter N by one in step S108 when the predetermined time period has elapsed, and then the process proceeds to step S109. In step S109 in FIG. 12, the flight path calculation unit 34 determines if the counter N indicates a number greater than or equal to Nend that is the last number. If the flight path calculation unit 34 makes a determination of "NO" in step S109, the process returns to step S102, and steps S102 to S108 are performed. The flight path calculation unit 34 then calculates time t3 at which the scene 73 is started, by adding the duration of BB seconds of the scene 72 to the time t2 and calculates an absolute position ad3 corresponding to the relative position d3 with respect to the ground surface at the time t3, thereby calculating a flight path for capturing a video from the scene 72 of Number 002 until before the scene 73 of Number 003. The flight path calculation unit 34 outputs the results to the flight control unit 37. Here, the predetermined time period only needs to be a time period during which the drone 30 can fly along the flight path, and it may be set to, for example, five to ten seconds.

Similarly, the flight path calculation unit 34 calculates, at a predetermined time before each of the durations of Numbers 003 to 005 end, a flight path for capturing a video from the scene 73 of Number 003 until before the scene 74 of Number 004 and a flight path for capturing a video from the scene 74 of Number 004 until before the scene 75 of Number 005 and outputs the results to the flight control unit 37. Then, if the flight path calculation unit 34 makes a determination of "YES" in step S109, the flight path calculation unit 34 ends calculation of flight paths.

Figure 13:
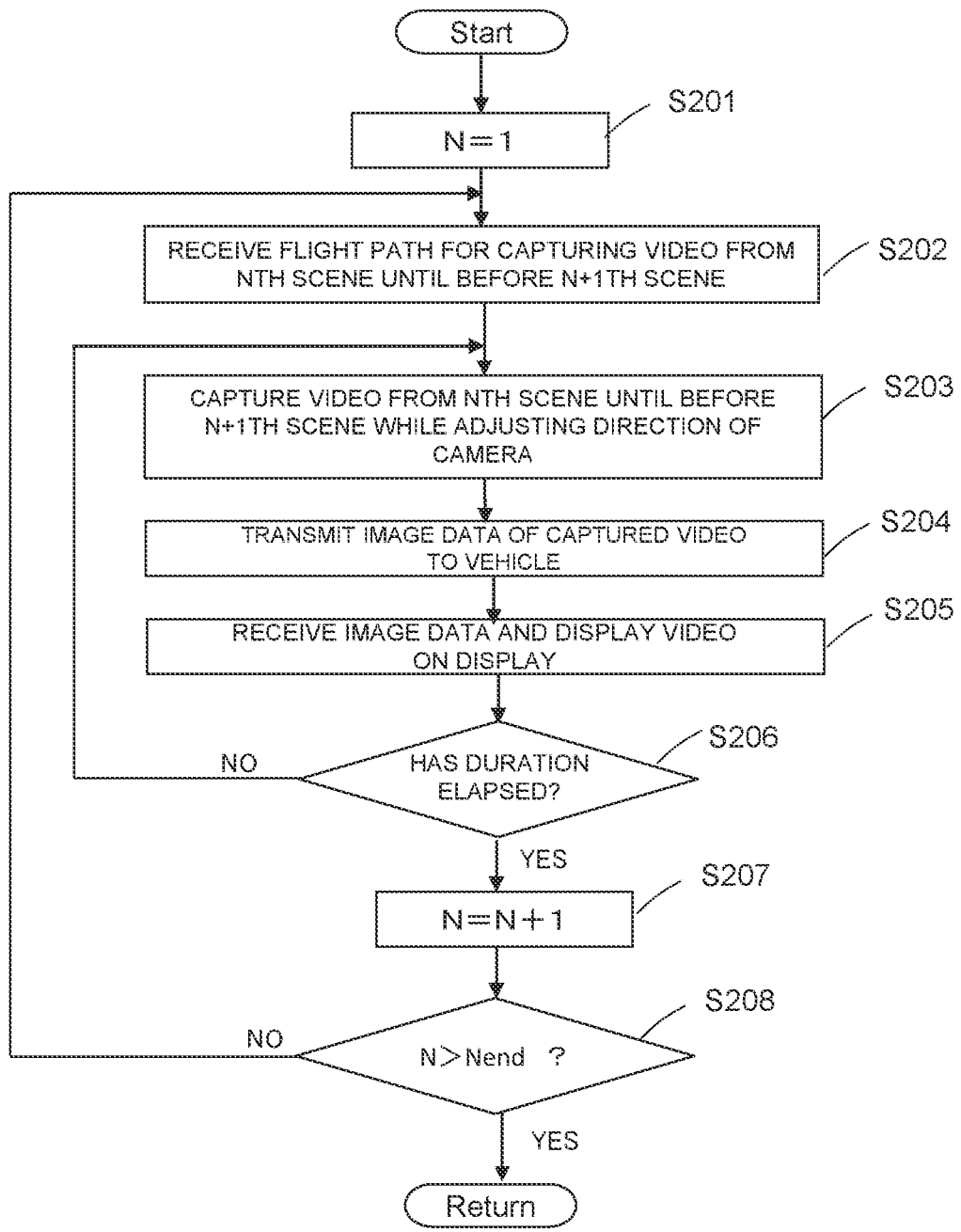
FIG. 13 is a flowchart of the operation of the drone system according to the embodiment.

Meanwhile, the flight control unit 37 sets the counter N to one, as shown in step S201 in FIG. 13, and then receives, in step S202, data of the flight path for capturing a video from the scene 71 of Number 001 until before the scene 72 of Number 002 in the scene information database 36 from the flight path calculation unit 34. The flight control unit 37 then adjusts the propeller drive unit 51 in step S203 and causes the drone 30 to fly according to the flight path input from the flight path calculation unit 34.

In step S203 in FIG. 13, the camera control unit 38 captures a video of the traveling vehicle 10 from the scene 71 until before the scene 72 while adjusting the direction of the camera 52 toward the vehicle 10 based on flight information of the drone 30 including, for example, the flight direction and the flying speed input from the flight control unit 37 and the information about the relative positions d1 and d2 with respect to the vehicle 10 stored in the scene information database 36.

Further, in step S204 in FIG. 13, the camera control unit 38 causes the image storage unit 39 to store data of the video from the scene 71 until before the scene 72 captured by the camera 52 and transmits image data of the video to the vehicle 10 in real time via the communication devices 16 and 45 and the communication line 60.

As shown in S205 in FIG. 13, the navigation device 21 of the vehicle 10 displays, as a video, the image data of the video transmitted from the drone 30 on the display 27. The display 27 displays the video from the scene 71 until before the scene 72 in real time.

The flight control unit 37 then determines if the duration of AA seconds of the scene 71 of Number 001 has elapsed in step S206 in FIG. 13, and if it makes a determination of "NO" in step S206, the process returns to step S203 in FIG. 13. The flight control unit 37, the camera control unit 38, and the navigation device 21 then continue to carry out steps S203 to S205.

Meanwhile, if the flight control unit 37 makes a determination of "YES" in step S206, it increments the counter N by one in step S207, and the process proceeds to step S208 in FIG. 13. In step S208, the flight control unit 37 determines if the counter N indicates a number greater than or equal to Nend, which is the last number.

If the flight control unit 37 makes a determination of "NO" in step S208, the process returns to step S202, and the flight control unit 37 receives data of the flight path for capturing a video from the scene 72 of Number 002 until before the scene 73 of Number 003 in the scene information database 36. Then, in step S203, the flight control unit 37 adjusts the propeller drive unit 51 and causes the drone 30 to fly according to the flight path input from the flight path calculation unit 34.

Then, in step S203 in FIG. 13, the camera control unit 38 captures a video of the traveling vehicle 10 from the scene 72 until before the scene 73 while adjusting the direction of the camera 52 toward the vehicle 10. In step S204, the camera control unit 38 causes the image storage unit 39 to store data of the video from the scene 72 until before the scene 73 captured by the camera 52 and transmits the image data of the video to the vehicle 10 in real time. In step S205, the navigation device 21 of the vehicle 10 displays the video from the scene 72 until before the scene 73 on the display 27 in real time.

Similarly, if the flight control unit 37 makes a determination of "NO" in step S208, the flight control unit 37, the camera control unit 38, and the navigation device 21 of the vehicle 10 repeat steps S202 to S207 in FIG. 13. They receive, from the flight path calculation unit 34, data of the flight path for capturing a video from the scene 73 of Number 003 until before the scene 74 of Number 004 and the flight path for capturing a video from the scene 74 of Number 004 until before the scene 75 of Number 005 in the scene information database 36, capture videos of the scenes, and display the results on the display 27 of the vehicle 10 in real time.

Then, if the flight control unit 37 makes a determination of "YES" in step S208 in FIG. 13, video capturing is ended.

As described above, the drone system 100 according to the embodiment can capture images of the traveling vehicle 10 from various directions in accordance with the scenes of a video while flying, for example, beside or in front of the vehicle 10.

Also, the drone system 100 according to the embodiment acquires the speed information, the acceleration information, the braking information, and the steering information from the vehicle 10 and estimates future traveling positions of the vehicle 10 based on this acquired information. The drone system 100 can therefore quickly calculate future traveling positions of the vehicle 10, and even when the traveling speed of the vehicle 10 is fast, the drone 30 can be ensured to fly to pass through the relative positions d1 to d5 or the absolute positions ad1 to ad5 with respect to the vehicle 10 in capturing images of the scenes of the video.

Further, in the drone system 100 according to the embodiment, the drone 30 sends the image data of the captured video in real time, and the vehicle 10 receives the image data and displays the video on the display 27 in the vehicle. This enables passengers in the vehicle 10 to feel as if they are looking at their traveling vehicle 10 while flying like a bird.

Further, although, in the above description, the operation of the functional blocks of the drone 30 has been described, as described above, the functional blocks are implemented when the CPU 81 of the general purpose computer 80, which is a processor for performing information processing, executes programs. Accordingly, the operation of the drone 30 described above also means the operation of the processor constituting the controller 31 of the drone 30.

To operate the drone 30, the processor of the controller 31 is operated as described below. That is, the processor receives vehicle information from the vehicle 10, estimates a future traveling position of the vehicle 10 based on the received vehicle information, calculates, for each of the scenes, a flight path that passes through a relative position with respect to the vehicle 10 based on the estimated future traveling position of the vehicle 10 and the scene information database 36, causes the drone 30 to fly according to the calculated flight path, and captures images of the vehicle 10 with the camera 52. Also, calculation of a flight path by the flight path calculation unit 34 is based on the operation of the processer described below. That is, the processor calculates, based on the estimated future traveling positions of the vehicle 10 and the relative positions with respect to the vehicle 10 stored in the scene information database 36, absolute positions ad1 to ad5 of the relative positions d1 to d5 with respect to the ground surface for capturing images of the scenes stored in the scene information database and calculates, for each of the scenes stored in the scene information database 36, a flight path that passes through one of the absolute positions ad1 to ad5.

In the above description of the drone system 100 according to the embodiment, the camera control unit 38 has been described as capturing a video of the traveling vehicle 10 while adjusting the direction of the camera 52 toward the vehicle 10 based on the information about the relative positions d1 to d5 with respect to the vehicle 10 stored in the scene information database 36. In this case, the scene information database 36 does not have to store data of the scenes. If the data of the scenes are stored in the scene information database 36, a video of the vehicle 10 may be captured as below.

In the scene information database 36, the data of the scenes 71 to 75 of the video to be captured described above with reference to FIGS. 6 to 10, the information about the relative positions d1 to d5 with respect to the vehicle 10, and the durations of the scenes are associated with one another. The camera control unit 38 may capture a video while adjusting the direction and angle of view of the camera 52 based on images captured by the camera 52 and the images of the scenes 71 to 75 contained in the scene information database 36. In this case, for example, the images of the scenes 71 to 75 may be compared in size with the images captured by the camera 52 to adjust the angle of view of the camera 52. The positions of the vehicle 10 in the images may also be compared with each other to adjust the direction of the camera 52.

Drone System According to Another Embodiment

Next, a drone system 200 according to another embodiment will be described with reference to FIGS. 15 to 17. The portions that are similar to those of the drone system 100 described above with reference to FIGS. 1 and 14 are assigned the same reference signs, and their descriptions will be omitted.

Figure 15:
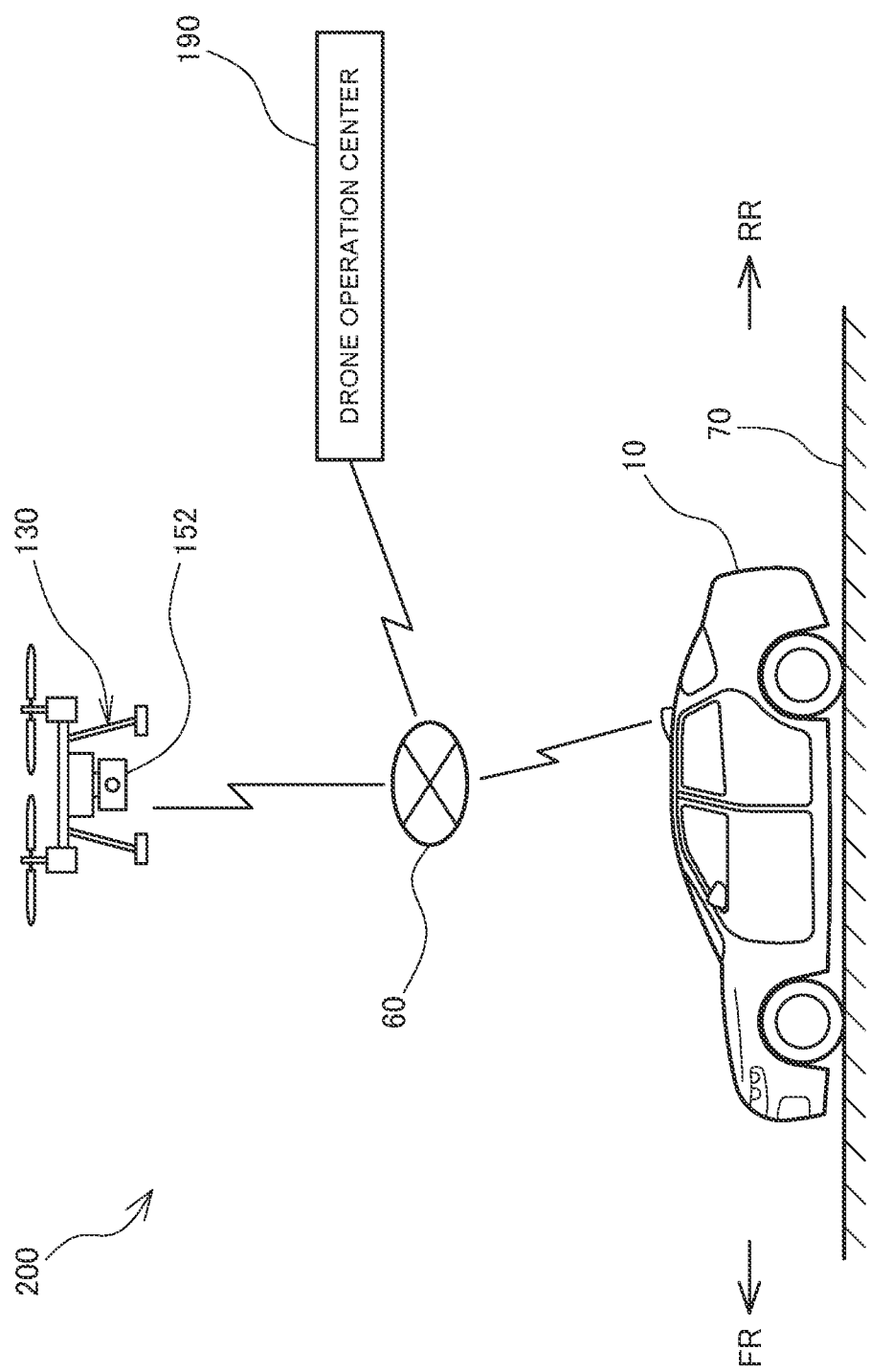
FIG. 15 is a system diagram showing a structure of a drone system according to another embodiment.

As shown in FIG. 15, the drone system 200 is composed of the vehicle 10, a drone 130, and a drone operation center 190. The structure of the vehicle 10 is the same as the vehicle 10 of the drone system 100, and therefore its description will be omitted.

Figure 16:
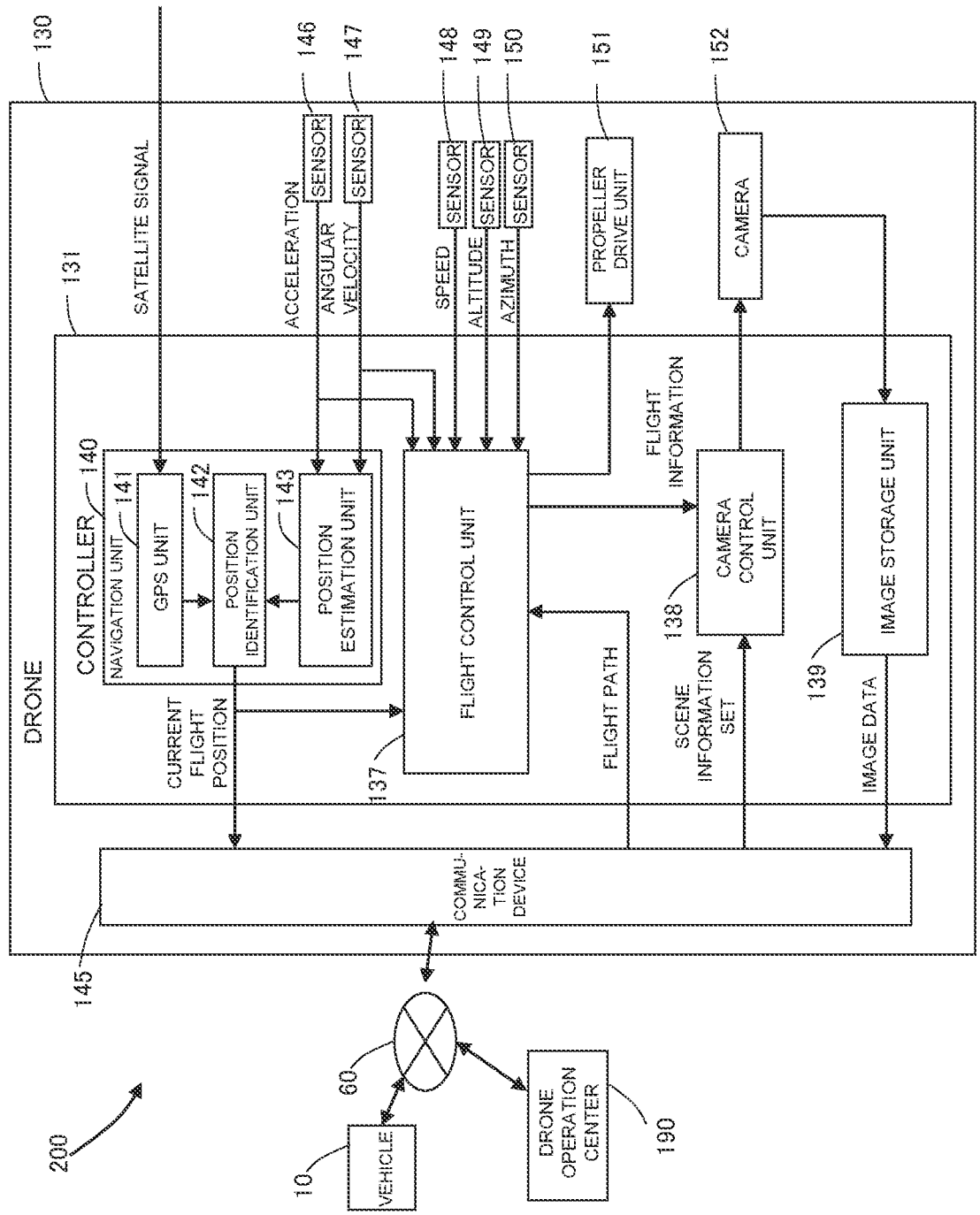
FIG. 16 is a functional block diagram of a drone constituting the drone system according to the other embodiment.
Figure 17:
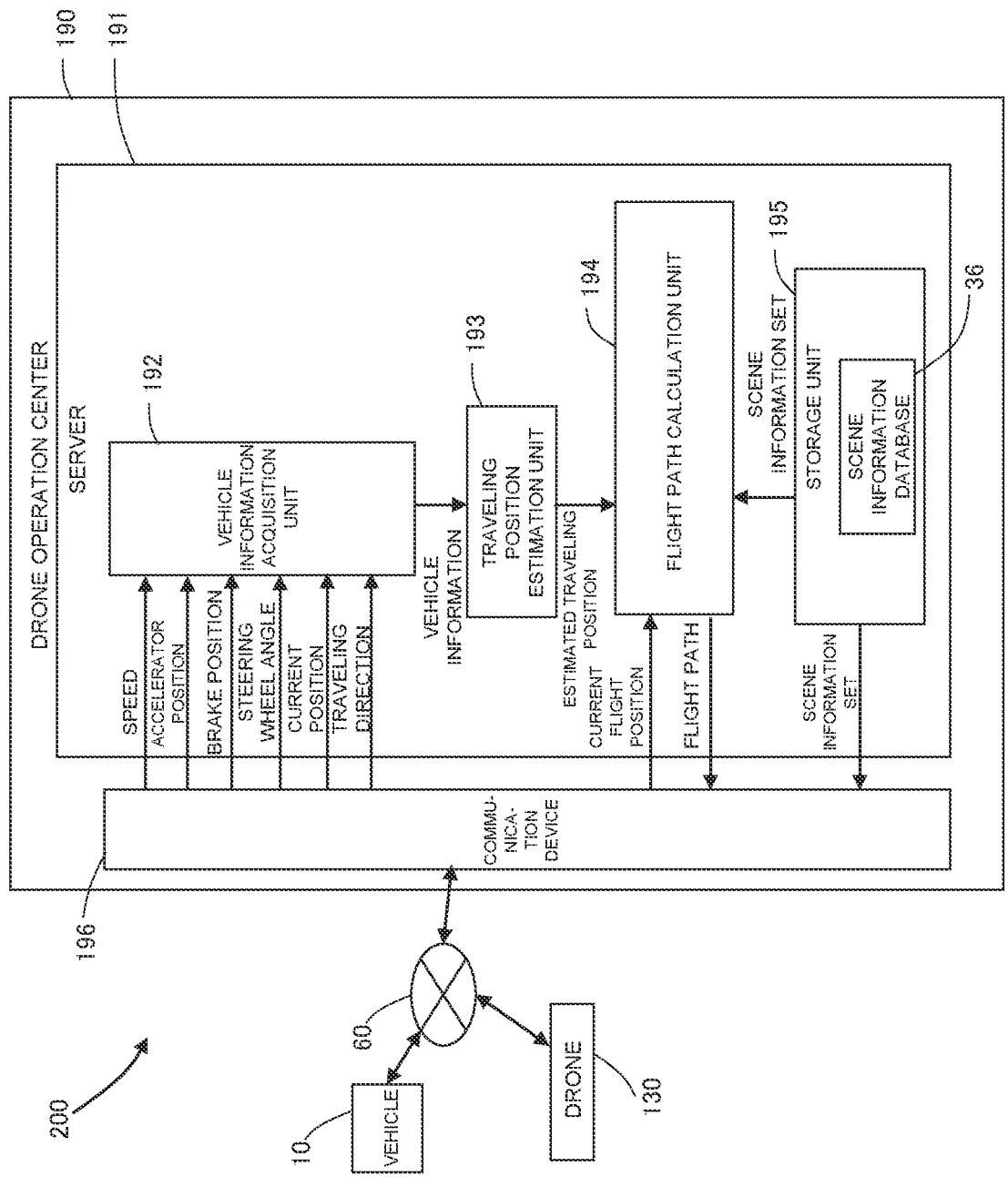
FIG. 17 is a functional block diagram of a drone operation center constituting the drone system according to the other embodiment.

As shown in FIGS. 16 and 17, in the drone system 200, a server 191 of the drone operation center 190 has a storage unit 195 for storing the scene information database 36. A flight path calculation unit 194 of the server 191 calculates a flight path based on vehicle information acquired from the vehicle 10 and the scene information database 36 and transmits the result to the drone 130. The drone 130 captures a video of the traveling vehicle 10 while flying according to the flight path transmitted from the server 191.

As shown in FIG. 16, a controller 131 of the drone 130 is obtained by removing, from the controller 31 of the drone 30 shown in FIG. 3, the vehicle information acquisition unit 32, the traveling position estimation unit 33, the flight path calculation unit 34, and the storage unit 35. The controller 131 of the drone 130 has four functional blocks, that is, a flight control unit 137, a camera control unit 138, an image storage unit 139, and a navigation unit 140. Although the flight control unit 137 performs the same operation as the operation of the flight control unit 37 of the drone 30 based on measurement data from an acceleration sensor 146, an angular velocity sensor 147, a speed sensor 148, an altitude sensor 149, and an azimuth sensor 150, a flight path, and a current flight position of the drone 130, it differs from the flight control unit 37 in that it receives flight path data as an input from a communication device 145. Also, although the camera control unit 138 performs the same operation as the operation of the camera control unit 38 of the drone 30, it differs from the camera control unit 38 in that it receives a scene information set 36a as an input from the communication device 145. Furthermore, although the navigation unit 140 has a GPS unit 141, a position identification unit 142, and a position estimation unit 143 and performs the same operation as the operation of the navigation unit 40 of the drone 30, it differs from the navigation unit 40 in that it outputs a current flight position to the communication device 145.

As shown in FIG. 17, the server 191 of the drone operation center 190 includes four functional blocks, that is, a vehicle information acquisition unit 192, a traveling position estimation unit 193, a flight path calculation unit 194, and a storage unit 195, and a communication device 196. The vehicle information acquisition unit 192, the traveling position estimation unit 193, and the flight path calculation unit 194 perform the same operation as the operation performed by the vehicle information acquisition unit 32, the traveling position estimation unit 33, and the flight path calculation unit 34 of the drone 30 shown in FIG. 3. However, the flight path calculation unit 194 differs from the flight path calculation unit 34 in that it receives data of a current flight position of the drone 130 as an input from the communication device 196, and in that it outputs data of the calculated flight path to the communication device 196. In addition, although the storage unit 195 stores the scene information database 36 like the storage unit 35 of the drone 30, it differs from the storage unit 35 in that it outputs a scene information set 36a to the communication device 196.

Like the controller 31 of the drone 30 shown in FIG. 3, the controller 131 of the drone 130 and the server 191 can be implemented by the general purpose computer 80 including the CPU 81, which is the processor described with reference to FIG. 4.

Image Capturing Operation by Drone System According to the Other Embodiment

In the drone system 200, the operations in steps S102 to S106 shown in FIG. 12 are performed by the functional blocks of the flight path calculation unit 194, the vehicle information acquisition unit 192, and the traveling position estimation unit 193 of the server 191 of the drone operation center 190. In step S106 in FIG. 12, the server 191 transmits the flight path calculated by the flight path calculation unit 194 to the drone 130. The drone 130 is caused to fly by the flight control unit 137 according to the flight path received from the sever 191, captures, in step S107 in FIG. 12, a video of the vehicle 10 by the camera control unit 138 and the camera 152, and stores, in step S109, the video in the image storage unit 139 and transmits image data to the vehicle 10. The navigation device 21 of the vehicle 10 displays, as a video, the image data received from the drone 130 on the display 27 in step S109 in FIG. 12.

Although, in the above description, the operations of the server 191 and the drone 130 have been described as the operations of the functional blocks of the server 191 and the functional blocks of the drone 130, as described above, the functional blocks are implemented when the CPU 81 of the general purpose computer 80, which is a processor for performing information processing, executes programs. Accordingly, the operation of the server 191 of the drone system 200 described above means the operation of the processor constituting the server 191.

The operation of the processor constituting the server 191 is as described below. The processor of the server 191 receives vehicle information from the vehicle 10, estimates a future traveling position of the vehicle 10 based on the received vehicle information, calculates a flight path that passes through a relative position with respect to the vehicle 10 for each of the scenes based on a current flight position of the drone 130 received from the drone 130, the estimated future traveling position of the vehicle 10, and the scene information database 36, and sends the resulting flight path to the drone 130.

In the drone system 200 described above, calculation of the flight path is carried out by the server 191 of the drone operation center 190, and it is thus possible to calculate the flight path quickly and capture images of the traveling vehicle 10 from various directions in accordance with the scenes of the video. It is thus also possible to reduce the size of electronic devices mounted on the drone 130 and thus reduce the weight of the drone 130, thereby achieving a compact system.

Figure 18:
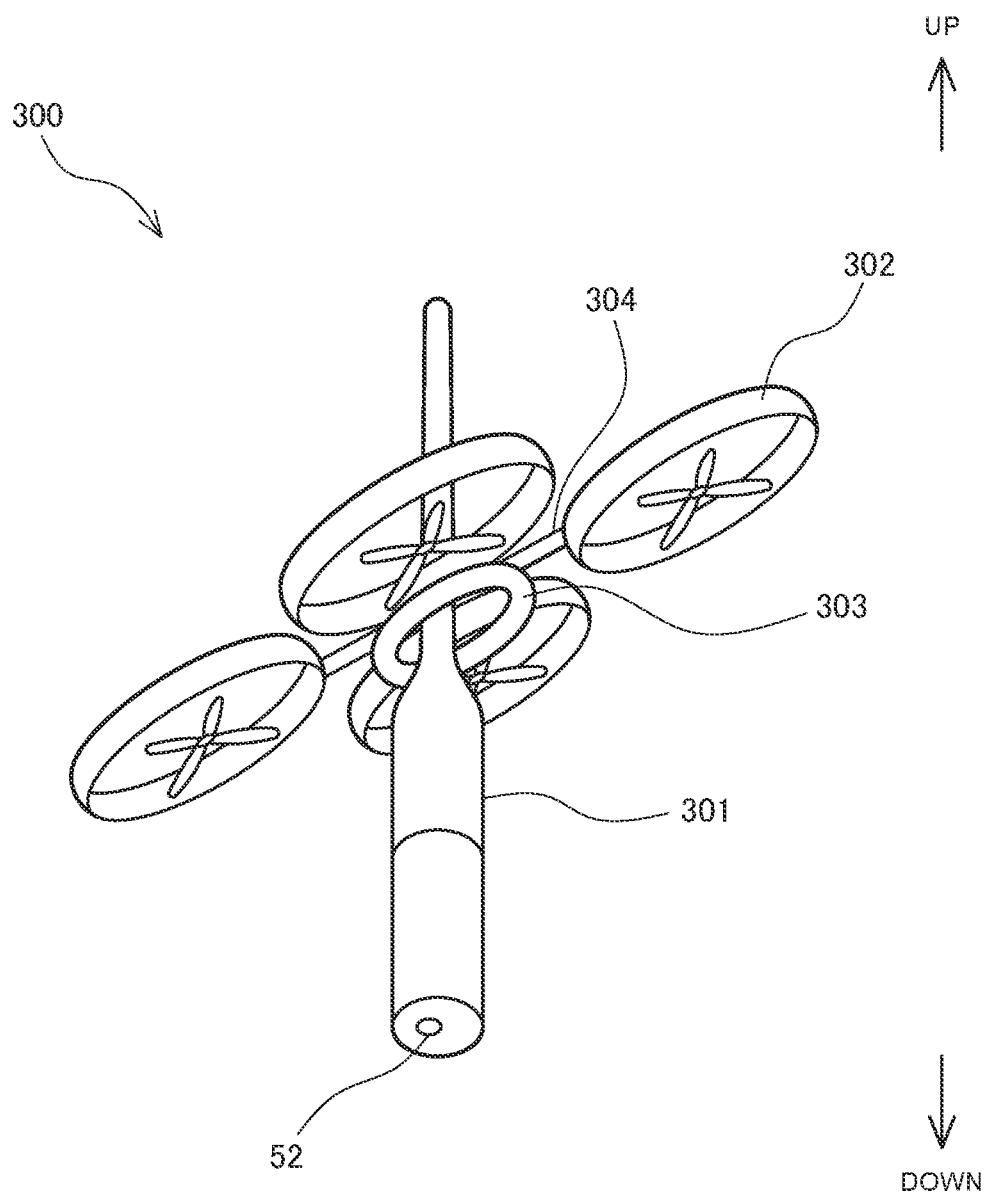
FIG. 18 is a perspective view of the drone used in the drone system according to the embodiment or the drone system according to the other embodiment.

Although, in the drone systems 100 and 200 described above, the drone 30 has been described as a flying object that flies autonomously by driving a plurality of propellers with a motor, it is also possible, for example, to use a drone 300 shown in FIG. 18 that is composed of a rod-shaped body 301 extending vertically in the center, propeller assemblies 302 including propellers and drive motors, and an annular actuator 303 to which the four propeller assemblies 302 are attached via arms 304. The actuator 303 is attached to the outside of the body 301 such that it can be inclined with respect to the body 301 to adjust the angle of inclination of the propeller assemblies 302 with respect to the body 301. Furthermore, the camera 52 is attached to the lower end of the body 301.

The drone 300 keeps the body 301 vertical and adjusts the angle of inclination of the propeller assemblies 302 with respect to the body 301 by the actuator 303, thereby flying in the front-and-rear direction and the right-and-left direction. Thus, the drone 300 can fly without tilting the body 301 during flight, and stabilize the position and direction of the camera 52. It is therefore possible to capture a video in a smoother and more stable manner.

The invention claimed is:

1. A drone system comprising:
a vehicle; and
a drone that captures an image of the vehicle, wherein
the vehicle is connected to the drone via a communication line and sends vehicle information, including traveling information of the vehicle and navigation information of the vehicle, to the drone,
the drone is capable of autonomous flight and includes a camera for capturing an image and a controller for controlling flight and controlling the camera, and
the controller comprises
a storage unit that stores a scene information database including a plurality of scene information sets arranged in time series of a video to be captured, in each of the scene information sets, a relative position and a relative orientation of the drone with respect to the vehicle that is captured in an image of a scene of the video and a duration of the scene are associated with each other,
a vehicle information acquisition unit that receives the vehicle information from the vehicle,
a traveling position estimation unit that estimates a future traveling position of the vehicle based on the received vehicle information,
a flight path calculation unit that, based on the future traveling position of the vehicle estimated by the traveling position estimation unit and the scene information database, calculates, for each of the scenes, a flight path that passes through the relative position with respect to the vehicle,
a camera control unit that captures the video while adjusting the direction and an angle of the camera based on the relative positions with respect to the vehicle stored in the scene information database,
the scene information database includes the plurality of scene information sets arranged in time series of the video to be captured, and in each of the scene information sets, a scene of the video to be captured, the relative position with respect to the vehicle in capturing the scene, and the duration of the scene, are associated with one another, and
the camera control unit captures the video while adjusting the direction and the angle of view of the camera based on an image captured by the camera and the scene.

2. The drone system according to claim 1, wherein
the flight path calculation unit of the controller
calculates, based on the future traveling positions of the vehicle estimated by the traveling position estimation unit and the relative positions with respect to the vehicle stored in the scene information database, absolute positions of the relative positions with respect to the ground surface for capturing images of the scenes stored in the scene information database, and
calculates a flight path that passes through the absolute position for each of the scenes stored in the scene information database.

3. The drone system according to claim 1, wherein
the flight path calculation unit of the controller
calculates, based on the future traveling positions of the vehicle estimated by the traveling position estimation unit and the relative positions with respect to the vehicle stored in the scene information database, absolute positions of the relative positions with respect to the ground surface for capturing images of the scenes stored in the scene information database, and
calculates a flight path that passes through the absolute position for each of the scenes stored in the scene information database.

4. The drone system according to claim 1, wherein
the flight path calculation unit of the controller
calculates, based on the future traveling positions of the vehicle estimated by the traveling position estimation unit and the relative positions with respect to the vehicle stored in the scene information database, absolute positions of the relative positions with respect to the ground surface for capturing images of the scenes stored in the scene information database, and
calculates a flight path that passes through the absolute position for each of the scenes stored in the scene information database.

5. The drone system according to claim 1, wherein the traveling information sent by the vehicle includes speed information, acceleration information, braking information, and steering information.

6. The drone system according to claim 1, wherein the drone sends image data of the captured video in real time, and the vehicle receives the image data and displays the video on a display in the vehicle.

7. A vehicle image capturing method of capturing an image of a vehicle by a drone, wherein the vehicle is connected to the drone via a communication line and sends vehicle information, including traveling information of the vehicle and navigation information of the vehicle, to the drone, the drone is capable of autonomous flight and includes a camera for capturing an image and a controller for controlling flight and controlling the camera, the controller comprises a processor that performs information processing, and a storage unit that stores a scene information database including a plurality of scene information sets arranged in time series of a video to be captured, in each of the scene information sets, a relative position and a relative orientation of the drone with respect to the vehicle that is captured in a scene of the video and a duration of the scene are associated with each other, and the processor receives the vehicle information from the vehicle, estimates a future traveling position of the vehicle based on the received vehicle information, calculates, for each of the scenes, a flight path that passes through the relative position with respect to the vehicle based on the estimated future traveling position of the vehicle and the scene information database, and causes the drone to fly based on the calculated flight path and captures an image of the vehicle with the camera captures the video while adjusting the direction and an angle of the camera based on the relative positions with respect to the vehicle stored in the scene information database; and the scene information database includes the plurality of scene information sets arranged in time series of the video to be captured, and in each of the scene information sets, a scene of the video to be captured, the relative position with respect to the vehicle in capturing the scene, and the duration of the scene, are associated with one another, and captures the video while adjusting the direction and the angle of view of the camera based on an image captured by the camera and the scene.

8. A drone system comprising:

a vehicle;

a drone that captures an image of the vehicle; and a drone operation center that operates the drone, wherein the vehicle is connected to the drone operation center via a communication line and sends vehicle information including traveling information of the vehicle and navigation information of the vehicle to the drone operation center, the drone is capable of autonomous flight and includes a camera for capturing an image and a controller for controlling flight and controlling the camera, the drone is connected to the drone operation center via a communication line and sends a current flight position to the drone operation center, the drone operation center includes a server, the server comprises a storage unit that stores a scene information database including a plurality of scene information sets arranged in time series of a video to be captured, in each of the scene information sets, a relative position and a relative orientation of the drone with respect to the vehicle that is captured in a scene of the video and a duration of the scene being associated with each other, a vehicle information acquisition unit that receives the vehicle information from the vehicle, a traveling position estimation unit that estimates a future traveling position of the vehicle based on the received vehicle information, and a flight path calculation unit that, based on the current flight position of the drone received from the drone, the future traveling position of the vehicle estimated by the traveling position estimation unit, and the scene information database, calculates, for each of the scenes, a flight path that passes through the relative position with respect to the vehicle and sends the result to the drone, and the drone captures an image of the vehicle with the camera while flying autonomously according to the flight path received from the server, the controller comprises a camera control unit that captures the video while adjusting the direction and an angle of the camera based on the relative positions with respect to the vehicle stored in the scene information database; and the scene information database includes the plurality of scene information sets arranged in time series of the video to be captured, and in each of the scene information sets, a scene of the video to be captured, the relative position with respect to the vehicle in capturing the scene, and the duration of the scene, are associated with one another, and the camera control unit captures the video while adjusting the direction and the angle of view of the camera based on an image captured by the camera and the scene.

* * * * *